(12) United States Patent
Noda et al.

(10) Patent No.: US 11,936,823 B2
(45) Date of Patent: Mar. 19, 2024

(54) MEDIUM TRANSPORT DEVICE AND IMAGE READING APPARATUS

(71) Applicant: SEIKO EPSON CORPORATION, Tokyo (JP)

(72) Inventors: Kazuhito Noda, Shiojiri (JP); Ryoichi Shuto, Kitakyushu (JP); Masaki Namiki, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/346,934

(22) Filed: Jul. 5, 2023

(65) Prior Publication Data
US 2024/0015253 A1    Jan. 11, 2024

(30) Foreign Application Priority Data

Jul. 8, 2022   (JP) ................................. 2022-110166

(51) Int. Cl.
*H04N 1/00*   (2006.01)
(52) U.S. Cl.
CPC ..... *H04N 1/00525* (2013.01); *H04N 1/00602* (2013.01); *H04N 1/00615* (2013.01); *H04N 1/00628* (2013.01)
(58) Field of Classification Search
CPC .............. B65H 1/14; B65H 2402/20; B65H 2403/544; B65H 2405/15; B65H 2801/06; G03G 15/2028; G03G 15/2053; G03G 15/206; G03G 2215/0132; G03G 2215/2061; B41J 2/01; B41J 2/17; B41J 2/175; B41J 2/17593; H04N 1/00525; H04N 1/00602; H04N 1/00615; H04N 1/00628

USPC ........................................................... 358/498
See application file for complete search history.

(56) References Cited

U.S. PATENT DOCUMENTS

| | | | | |
|---|---|---|---|---|
| 5,205,551 A | * | 4/1993 | Nagano ................ | G03G 15/234 271/291 |
| 6,834,853 B2 | * | 12/2004 | Trovinger ................ | B65H 7/08 83/156 |
| 7,435,023 B2 | * | 10/2008 | Sasaki ................ | H04N 1/00649 400/607.2 |

(Continued)

FOREIGN PATENT DOCUMENTS

| | | |
|---|---|---|
| JP | 2008-207944 A | 9/2008 |
| JP | 2023-112809 | 8/2023 |

*Primary Examiner* — Negussie Worku
(74) *Attorney, Agent, or Firm* — WORKMAN NYDEGGER

(57) ABSTRACT

There is provided a medium transport device including a placement section on which a medium is placed, a transport path through which the medium is transported, a feeding roller that feeds the medium, a set guide configured to switch between a contact position where the medium and the feeding roller are brought into contact and a separation position where the medium and the feeding roller are separated, a restricting section configured to switch between a restricting position for restricting feeding of the medium by coming into contact with a leading end of the medium and an allowing position for allowing the feeding of the medium, and a drive source that generates power for switching of the set guide and switching of the restricting section. The set guide and the restricting section are provided below the transport path in a direction of gravity.

10 Claims, 30 Drawing Sheets

(56) References Cited

U.S. PATENT DOCUMENTS

| | | | |
|---|---|---|---|
| 2007/0182089 A1* | 8/2007 | Kawashima | B65H 9/166 |
| | | | 271/164 |
| 2008/0203652 A1 | 8/2008 | Yasukawa et al. | |
| 2017/0107072 A1* | 4/2017 | Nakamura | B65H 31/14 |
| 2019/0367307 A1* | 12/2019 | Kanamitsu | B65H 3/063 |
| 2022/0144568 A1* | 5/2022 | Migita | B65H 7/02 |
| 2023/0102828 A1* | 3/2023 | Koyanagi | H04N 1/00615 |
| | | | 358/474 |
| 2023/0242360 A1* | 8/2023 | Shuto | B65H 3/5215 |
| | | | 271/8.1 |
| 2023/0262179 A1* | 8/2023 | Shuto | H04N 1/00628 |
| | | | 358/498 |
| 2023/0276003 A1* | 8/2023 | Noda | H04N 1/00628 |
| | | | 358/498 |

* cited by examiner

MEDIUM TRANSPORT DEVICE AND IMAGE READING APPARATUS

The present application is based on, and claims priority from JP Application Serial Number 2022-110166, filed Jul. 8, 2022, the disclosure of which is hereby incorporated by reference herein in its entirety.

BACKGROUND

1. Technical Field

The present disclosure relates to a medium transport device and an image reading apparatus.

2. Related Art

Various medium transport devices have been used in the related art. In the devices, there is a medium transport device including a set guide that guides a medium to a feeding roller, and a restricting section that can switch between a restricting position for restricting feeding of the medium and an allowing position for allowing the feeding of the medium. For example, JP-A-2008-207944 discloses a sheet feeding device including a set guide that guides a sheet serving as the medium to a set roller serving as a feeding roller, and a flap that can switch between a standby position for prohibiting feeding of the sheet and a feeding position for allowing the feeding of the sheet.

The medium transport device is preferably reduced in size from a viewpoint of easy installation. However, in the sheet feeding device disclosed in JP-A-2008-207944, whereas the set guide is provided on a lower side of a transport path of the sheet, the flap is provided on an upper side of the transport path of the sheet. In this way, in a case of a configuration in which the set guide and the flap are provided on different sides across the transport path, the device tends to increase in size.

SUMMARY

According to the present disclosure, in order to solve the above-described problem, there is provided a medium transport device including a placement section on which a medium is placed, a transport path through which the medium is transported, a feeding roller that feeds the medium placed on the placement section in the transport path, a set guide that guides the medium to the feeding roller, the set guide configured to switch between a contact position where the medium and the feeding roller are brought into contact and a separation position where the medium and the feeding roller are separated, a restricting section configured to switch between a restricting position for restricting feeding of the medium by bringing the feeding roller into contact with a leading end of the medium in a feeding direction and an allowing position for allowing the feeding of the medium, and a drive source that generates power for switching of the set guide and switching of the restricting section. The set guide and the restricting section are provided below the transport path in a direction of gravity.

BRIEF DESCRIPTION OF THE DRAWINGS

FIG. 17A is a view illustrating a feeding start state, and FIG. 17B is a view illustrating a state where the separation roller is displaced.

FIG. 18A is a view illustrating a state when a plurality of sheet-shaped documents are fed, and FIG. 18B is a view illustrating a state when a booklet-shaped document is fed.

FIG. 20A is a view illustrating a state where a document is fed, and FIG. 20B is a view illustrating a state where a trailing end of the document to be fed passes through a contact position between the feeding roller and the separation roller.

FIG. 23A is a view illustrating a state where a document can be fed, and FIG. 23B is a view illustrating a feeding start state.

FIG. 24A is a view illustrating a state where the set flap is located below in accordance with FIG. 23A, FIG. 24B is a view illustrating an intermediate state where the set flap rotates and moves upward from a state in FIG. 24A, FIG. 24C is a view corresponding to FIG. 23B and illustrating a state where the set flap is located upward so that the set guide is pressed downward.

FIG. 29A is a view corresponding to FIGS. 23A and 24A and illustrating a state where the set flap cam is located below so that the set flap is located below, FIG. 29B is a view corresponding to FIGS. 23B and 24C and illustrating a state where the set flap cam is located above so that the set flap is pressed upward.

DESCRIPTION OF EXEMPLARY EMBODIMENTS

Figure 1:
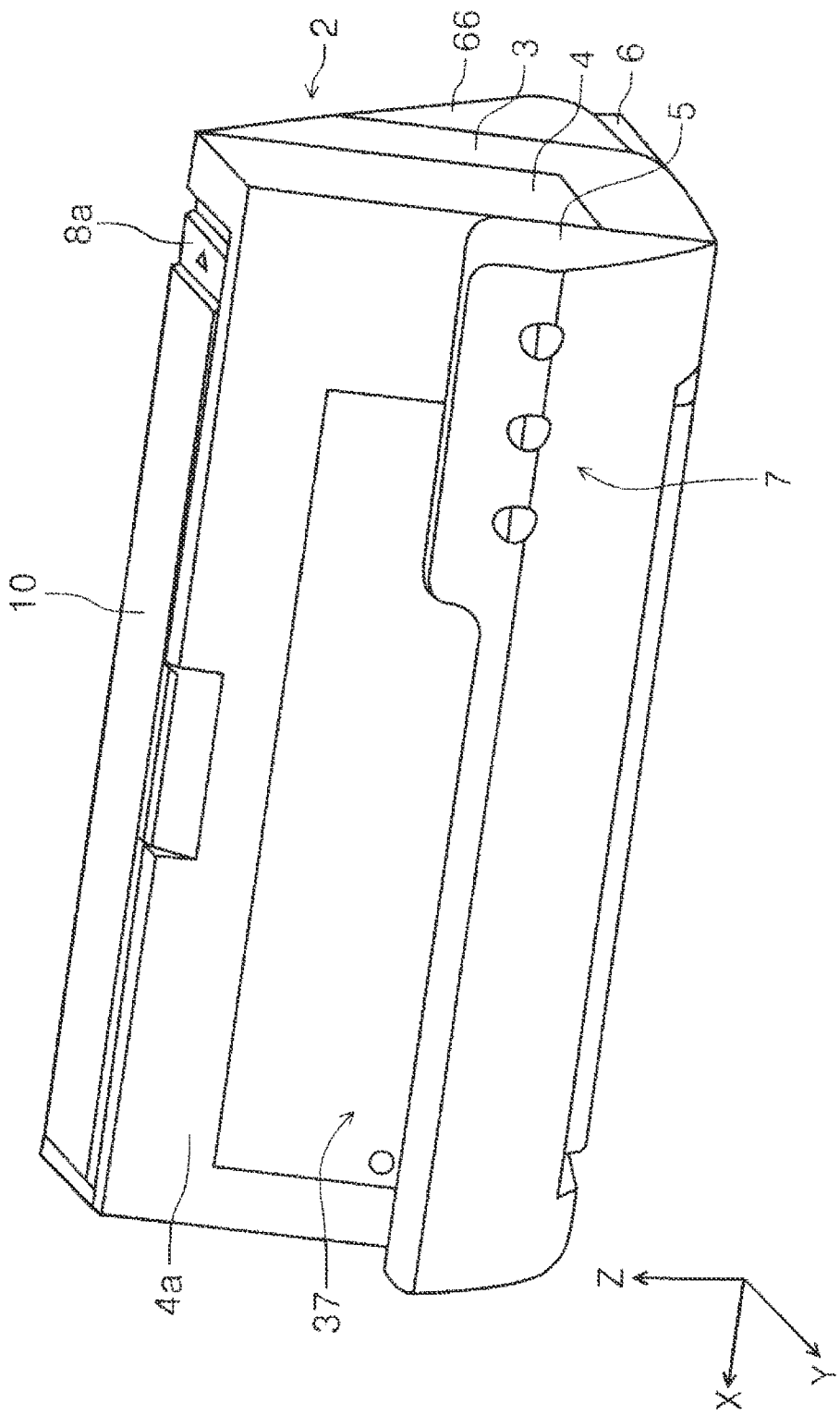
FIG. 1 is a perspective view when a scanner in which an apparatus main body is in a normal reading posture is viewed from a front side.

Hereinafter, the present disclosure will be schematically described.

According to a first aspect of the present disclosure, there is provided a medium transport device including a placement section on which a medium is placed, a transport path through which the medium is transported, a feeding roller that feeds the medium placed on the placement section in the transport path, a set guide that guides the medium to the feeding roller, the set guide configured to switch between a contact position where the medium and the feeding roller are brought into contact and a separation position where the medium and the feeding roller are separated, a restricting section configured to switch between a restricting position for restricting feeding of the medium by bringing the feeding roller into contact with a leading end of the medium in a feeding direction and an allowing position for allowing the feeding of the medium, and a drive source that generates power for switching of the set guide and switching of the restricting section. The set guide and the restricting section are provided below the transport path in a direction of gravity.

According to the present aspect, the set guide and the restricting section are provided below the transport path in the direction of gravity. That is, both the set guide and the restricting section are provided on the same side with respect to the transport path. Therefore, the medium transport device can be formed to be thin in the direction of gravity, and the medium transport device can be reduced in size.

According to a second aspect of the present disclosure, in the medium transport device according to the first aspect, the drive source may be provided below the transport path in the direction of gravity.

According to the present aspect, in addition to the set guide and the restricting section, the drive source is also provided below the transport path in the direction of gravity. Therefore, the medium transport device can be configured to be particularly thin in the direction of gravity, and the medium transport device can be particularly reduced in size.

In addition, according to a third aspect of the present disclosure, in the medium transport device according to the first or second aspect, when power is transmitted from the drive source via the restricting section, and the restricting section is located at the restricting position, the set guide may be located at the separation position, and when the restricting section is located at the allowing position, the set guide may be located at the contact position.

According to the present aspect, when the power is transmitted from the drive source via the restricting section, and the restricting section is located at the restricting position, the set guide is located at the separation position, and when the restricting section is located at the allowing position, the set guide is located at the contact position. Therefore, a configuration for transmitting the power from the drive source to the set guide can be simplified. when the restricting section is located at the restricting position, the set guide can be located at a position where the medium is not fed to the feeding roller, and when the restricting section is located at the allowing position, the set guide can be located at a position where the medium is fed to the feeding roller.

In addition, according to a fourth aspect of the present disclosure, in the medium transport device according to the third aspect, the set guide may have a contact portion that comes into contact with the restricting section, may be switched to the separation position when the restricting section may come into contact with the contact portion, and may be switched to the contact position when the restricting section may be separated from the contact portion.

According to the present aspect, the restricting section comes into contact with the contact portion so that the set guide is switched to the separation position, and the restricting section is separated from the contact portion so that the set guide is switched to the contact position. In this way, the set guide has a configuration in which the power is directly transmitted from the restricting section. Therefore, a configuration in which the power is transmitted from the drive source to the set guide can be particularly simplified.

In addition, according to a fifth aspect of the present disclosure, the medium transport device according to any one of the first to fourth aspects further may include a transport roller pair that transports the medium fed by the feeding roller in the transport path. The drive source may generate power for at least one of the feeding roller and the transport roller pair.

According to the present aspect, the drive source generates the power for at least one of the feeding roller and the transport roller pair. That is, the drive source that generates the power for switching of the set guide and switching of the restricting section also serves as a drive source that generates the power for at least one of the feeding roller and the transport roller pair. Therefore, the number of the drive sources can be reduced, a device configuration can be simplified, and the medium transport device can be particularly reduced in size.

In addition, according to a sixth aspect of the present disclosure, the medium transport device according to any one of the first to fifth aspects further may include a separation roller that is disposed to face the feeding roller and separating the medium by nipping the medium together with the feeding roller when a plurality of the media are stacked and placed on the placement section, and a path member that is disposed on at least a portion around the separation roller and forms at least a portion of the transport path. The set guide and the restricting section may be attached to the path member.

When a positional relationship between the set guide and the restricting section deviates from a preferable positional relationship, there is a possibility that functions of the set guide and the restricting section may be insufficient. However, according to the present aspect, the set guide and the restricting section can be attached to the path member. Therefore, the set guide and the restricting section can be attached to the same member, and it is possible to prevent the positional relationship between the set guide and the restricting section from deviating from the preferable positional relationship.

According to a seventh aspect of the present disclosure, in the medium transport device according to the sixth aspect, the path member may be attachable and detachable together with the set guide and the restricting section.

According to the present aspect, the path member is attachable and detachable together with the set guide and the restricting section. Therefore, for example, the set guide and the restricting section can also be separated by separating the path member when the separation roller is replaced, and replacement of the separation roller can be facilitated.

In addition, according to an eighth aspect of the present disclosure, the medium transport device according to any one of the first to fifth aspects may further include a separation roller that is disposed to face the feeding roller and separating the medium by nipping the medium together with the feeding roller when a plurality of the media are stacked and placed on the placement section, and a pressing portion that is disposed upstream of a nipping position between the feeding roller and the separation roller in the feeding direction, and configured to switch between a first position for pressing the feeding roller by moving forward to and rearward from the feeding roller and a second position for being separated from the feeding roller. After a trailing end of a preceding medium in the feeding direction, the preceding medium separated and fed precedently by the separation roller in the plurality of media stacked and placed at the second position, passes through the nipping position, a succeeding medium other than the preceding medium in the plurality of media stacked and placed at the first position may be pressed against the feeding roller, and power may be transmitted from the drive source via the set guide or the restricting section so that the pressing portion is switched between the first position and the second position.

According to the present aspect, the medium transport device includes the pressing portion switched between the first position and the second position by the power transmitted from the drive source via the set guide or the restricting section. Therefore, for example, even when a force is applied to the medium from the feeding roller to move in a direction opposite to the feeding direction, the pressing portion presses the medium. In this manner, it is possible to prevent the medium from moving in the direction opposite to the feeding direction. In addition, it is not necessary to separately prepare a mechanism for transmitting the power to the pressing portion. Therefore, a configuration for transmitting the power from the drive source to the pressing portion can be simplified.

In addition, according to a ninth aspect of the present disclosure, the medium transport device according to any one of the first to eighth aspects may further include a lower unit forming a lower surface below the transport path in the direction of gravity, and an upper unit that is provided to be openable and closeable with respect to the lower unit, and forms an upper surface above the transport path in the direction of gravity in a closed state. The set guide and the restricting section may be provided in the lower unit.

According to the present aspect, the medium transport device includes the lower unit and the upper unit, and the set guide and the restricting section are provided in the lower unit. Therefore, for example, in a sheet feed type medium transport device having the lower unit and the upper unit, the medium transport device can be effectively reduced in size. In addition, since the set guide and the restricting section are not provided in the upper unit, a weight of the upper unit can be reduced, and an opening/closing operation of the upper unit can be facilitated.

According to a tenth aspect, there is provided an image reading apparatus including the medium transport device according to any one of the first to ninth aspects, and a reading section that reads an image of the medium transported through the transport path.

According to the present aspect, in the image reading apparatus, an advantageous effect of any one of the first to ninth aspects described above can be obtained.

Hereinafter, the present disclosure will be specifically described.

In the following, as an example of the image reading apparatus, a scanner 1 which can read at least one surface of a first surface of a document and a second surface opposite to the first surface will be described as an example. The scanner 1 is a so-called sheet feed type scanner that performs reading while moving the document to a reading section (to be described later). In the present specification, the document includes not only a sheet-shaped document but also a card-shaped document or a booklet-shaped document. The document is an example of a medium.

In an X-Y-Z coordinate system illustrated in each drawing, an X-axis direction is an apparatus width direction, and is also a document width direction. A Y-axis direction is an apparatus depth direction, and a Z-axis direction is a direction along a vertical direction. In the present embodiment, a +Y-direction is a direction from a rear surface to a front surface of the apparatus, and a −Y-direction is a direction from the front surface to the rear surface of the apparatus. In addition, when viewed from the front surface of the apparatus, a leftward direction is an +X-direction, and a rightward direction is an −X-direction. In addition, in the following, a direction in which the document is transported may be referred to as "downstream", and a direction opposite thereto may be referred to as "upstream".

Figure 2:
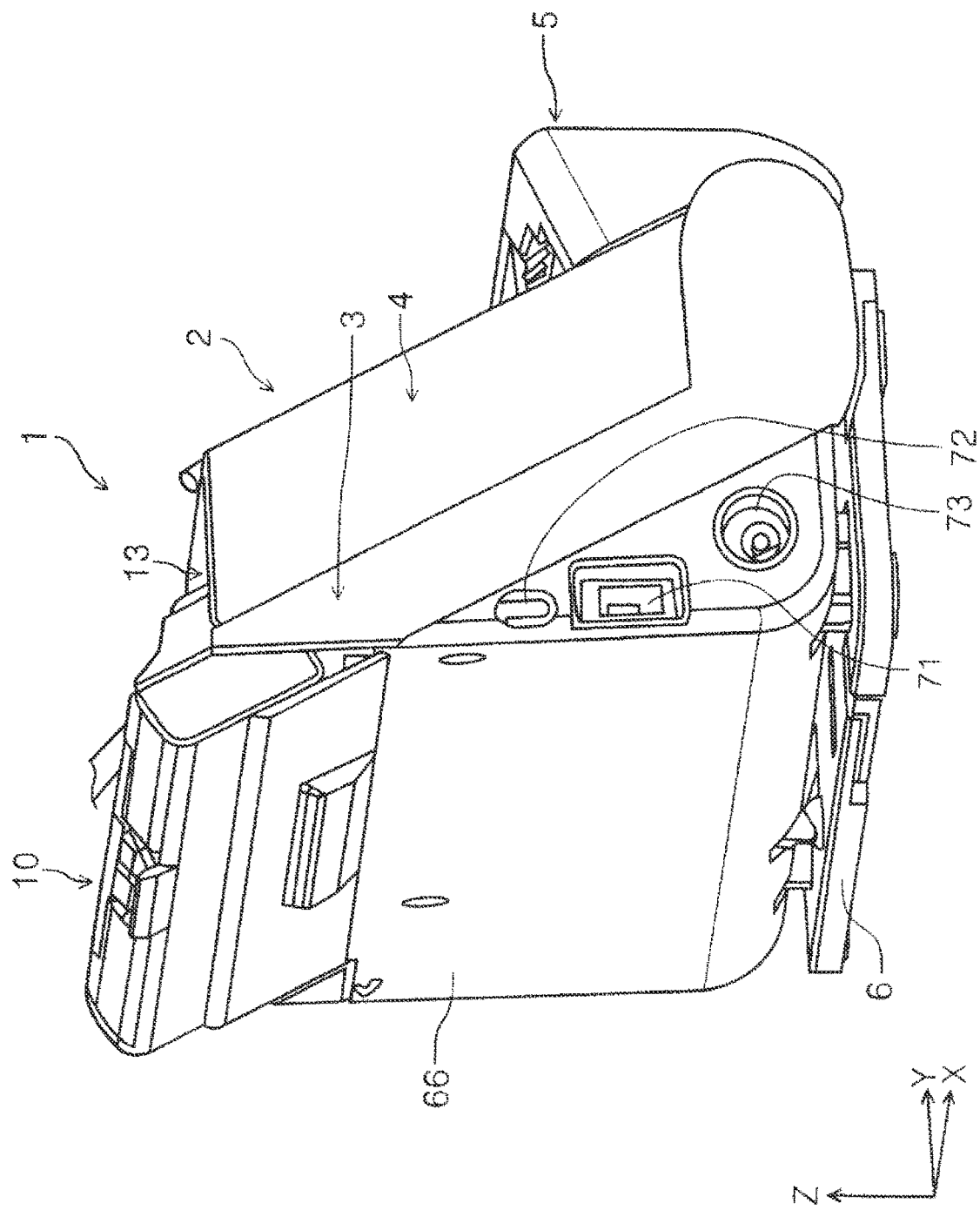
FIG. 2 is a perspective view when the scanner in which the apparatus main body is in the normal reading posture is viewed from a rear side.

In FIGS. 1 and 2, the scanner 1 includes a document feeding device 150 serving as an example of a medium feeding device. In the present embodiment, the document feeding device 150 has a configuration in which a first reading section 32 and a second reading section 33 (to be described later) are excluded from the scanner 1. However, from a viewpoint of feeding the document, the whole scanner 1 including the first reading section 32 and the second reading section 33 may be referred to as the document feeding device 150. In addition, since the scanner 1 internally transports the document, the scanner 1 can be regarded as the medium transport device. The scanner 1 according to the present embodiment includes an apparatus main body 2 and a main body support section 6 that supports the apparatus main body 2 to be rotatable. The apparatus main body 2 is configured to include a first unit 3, a second unit 4, and a third unit 5.

Figure 3:
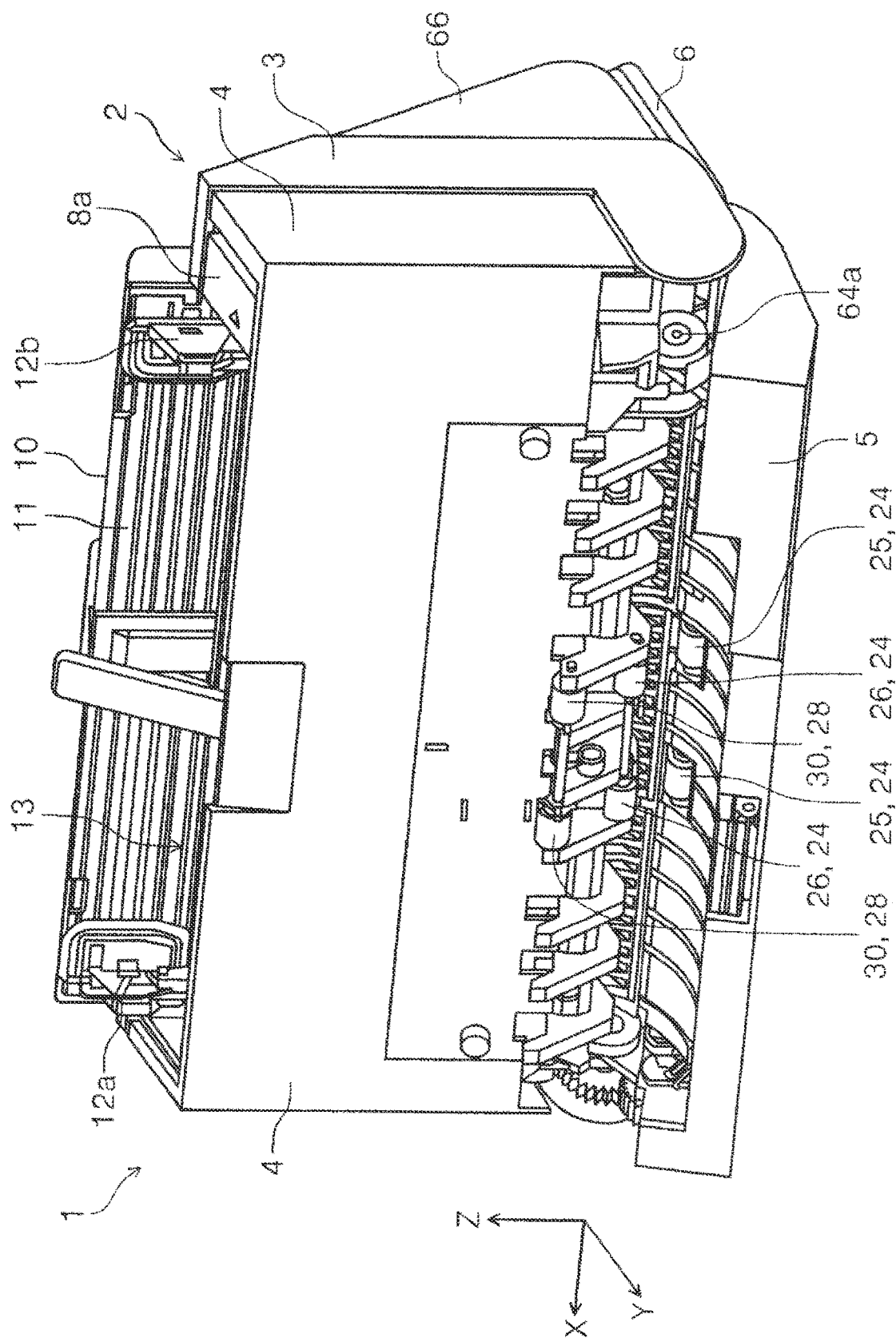
FIG. 3 is a perspective view when the scanner in which the apparatus main body is in the normal reading posture when a third unit is opened is viewed from the front side.
Figure 4:
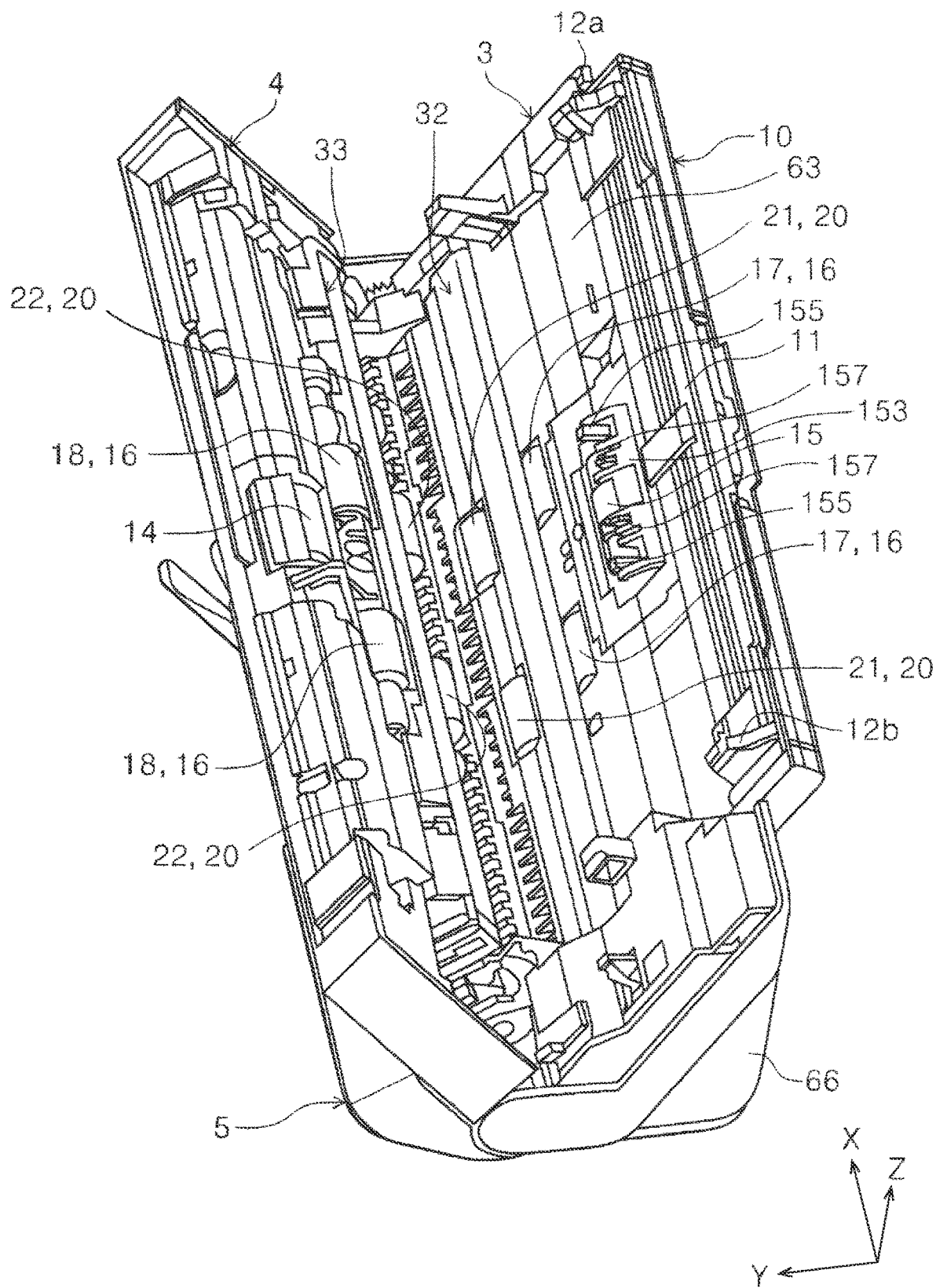
FIG. 4 is a perspective view when the scanner in which the apparatus main body is in the normal reading posture when a second unit is opened is viewed from above.

The second unit 4 and the third unit 5 are provided to be rotatable around a frame rotary shaft 64a (refer to FIG. 3). The frame rotary shaft 64a is a rotary shaft forming a rotary shaft center parallel to the X-axis direction. The second unit 4 and the third unit 5 can rotate integrally with the first unit 3 around the frame rotary shaft 64a (refer to FIG. 4). Since the second unit 4 and the third unit 5 are rotated with respect to the first unit 3, a portion of the document transport path can be exposed as illustrated in FIG. 4. In particular, a document feeding path R1 and a reading transport path R2 (to be described later) can be exposed. A user can unlock the second unit 4 with respect to the first unit 3 by sliding an unlocking portion 8a in the −X-direction, and can open the second unit 4.

In addition, the third unit 5 can rotate around the frame rotary shaft 64a with respect to the first unit 3 and the second unit 4 (refer to FIG. 3). Since the third unit 5 is rotated with respect to the first unit 3 and the second unit 4, a portion of the document transport path can be exposed as illustrated in FIG. 3. In particular, a reversing transport path R3 (to be described later) can be exposed.

Figure 5:
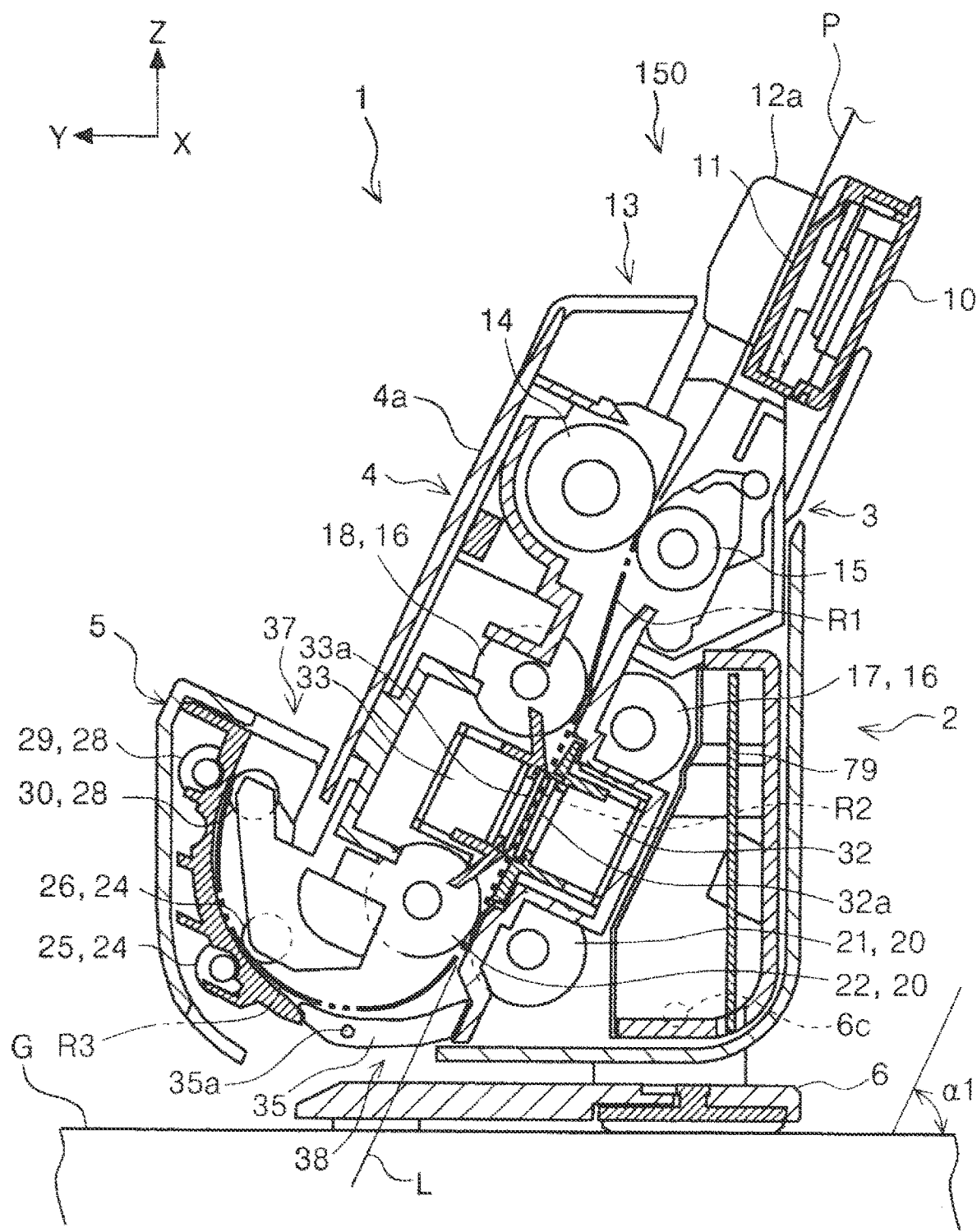
FIG. 5 is a sectional view when a document transport path of the scanner in which the apparatus main body is in the normal reading posture is viewed in a width direction.
Figure 6:
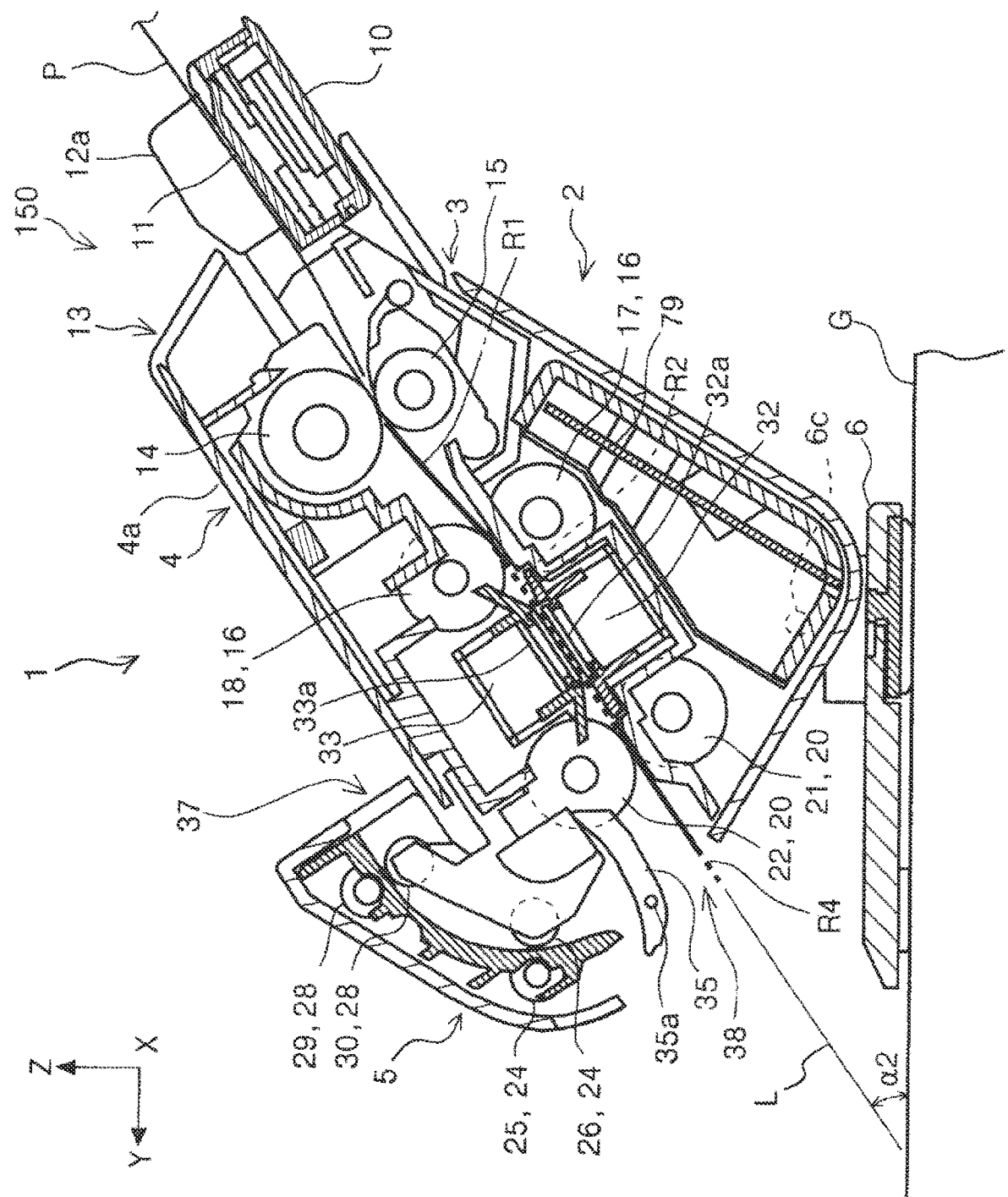
FIG. 6 is a sectional view when the document transport path of the scanner in which the apparatus main body is in a booklet reading posture is viewed in the width direction.

The apparatus main body 2 is rotatable around a main body rotary shaft 6c (refer to FIG. 7) with respect to the main body support section 6, and in the present embodiment, the apparatus main body 2 can rotate to hold two postures. The two postures of the apparatus main body 2 are illustrated in FIGS. 5 and 6. Hereinafter, a posture in FIG. 5 will be referred to as a normal reading posture, and a posture in FIG. 6 will be referred to as a booklet reading posture. The normal reading posture is an example of a first posture of the apparatus main body 2, and the booklet reading posture is an example of a second posture of the apparatus main body 2.

Each of an angle α1 illustrated in FIG. 5 and an angle α2 illustrated in FIG. 6 is an angle formed by an extension line L of a reading transport path R2 (to be described later) and a placement surface G of the apparatus. The angle α2 in the booklet reading posture is smaller than the angle α1 in the normal reading posture. In the normal reading posture, a projected area of the apparatus main body 2 on the placement surface G on which the scanner 1 is placed is smallest, that is, a footprint of the apparatus main body 2 has a smallest posture. The footprint in the present specification is an occupied area of the apparatus main body 2 in an X-Y-plane when the apparatus main body 2 is viewed from above. The normal reading posture is suitable for reading a sheet-shaped document, that is, a low rigid document which is likely to bend. The booklet reading posture is suitable for reading a highly rigid document which is less likely to bend, such as a plastic card or a booklet.

An operation section 7 configured to include a plurality of operation buttons including a power button is provided on a front surface of the apparatus. In addition, as illustrated in FIG. 2, a first coupling portion 71, a second coupling portion 72, and a third coupling portion 73 are provided on a side surface in the +X-direction, out of side surfaces forming a periphery of the apparatus. The first coupling portion 71 is a coupling portion to which a USB Type-A plug (not illustrated) serving as an example of a coupling target is coupled. The second coupling portion 72 is a coupling portion to which a USB Type-C plug (not illustrated) serving as an example of a coupling target is coupled. The third coupling portion 73 is a coupling portion to which a power plug (not illustrated) for supplying electric power to the apparatus main body 2 is coupled. The USB is an abbreviation for a universal serial bus, and each of the Type-A and the Type-C is one of a plurality of types defined in USB standards.

An external device can be coupled to the first coupling portion 71 via a USB cable (not illustrated), and a storage medium, for example, a USB memory (not illustrated) can be coupled to the first coupling portion 71. A control section 80 (refer to FIG. 8) can store read data in the storage medium coupled to the first coupling portion 71. In addition, an external device can be coupled to the second coupling portion 72 via a USB cable (not illustrated). The first coupling portion 71, the second coupling portion 72, and the third coupling portion 73 are provided on a circuit substrate 79 (refer to FIG. 7) located on the rear surface side of the apparatus. In the present embodiment, the apparatus main body 2 is configured to be capable of receiving electric power from the external device coupled to the second coupling portion 72.

Subsequently, a configuration of the document transport path in the scanner 1 will be described with reference to FIGS. 5 and 6. The document to be fed is supported in an inclined posture by the document support section 11. A reference numeral P represents a document to be supported. When a plurality of documents are supported by the document support section 11, an uppermost document is fed downstream by a feeding roller 14. The feeding roller 14 comes into contact with an upper surface of the document supported by the document support section 11. An upper opening/closing portion 10 is formed in the document support section 11. The upper opening/closing portion 10 is rotatable around a rotary shaft (not illustrated), and rotates to open/close a feeding port 13. FIG. 1 illustrates a state where the upper opening/closing portion 10 is closed, and FIG. 2 illustrates a state where the upper opening/closing portion 10 is opened. The upper opening/closing portion 10 forms the first unit 3.

As illustrated in FIG. 3, the document support section 11 is provided with a pair of edge guides 12a and 12b for guiding side edges of the document. The pair of edge guides 12a and 12b are provided to be slidable in the document width direction (X-axis direction). The pair of edge guides 12a and 12b are provided to be in conjunction with each other by a rack pinion mechanism (not illustrated) so that both are separated from each other or close to each other across a center position in the document width direction. That is, the scanner 1 adopts a so-called center feeding method.

The feeding roller 14 is provided in the second unit 4. When the second unit 4 is closed with respect to the first unit 3, the feeding roller 14 comes into contact with a separation roller 15 (to be described later). When the second unit 4 is opened with respect to the first unit 3, the feeding roller 14 is separated from the separation roller 15. The feeding roller 14 is rotated by obtaining power from a transport motor 50 (to be described later). The separation roller 15 is provided at a position facing the feeding roller 14 in the first unit 3. A rotational torque is applied to the separation roller 15 by a torque limiter (not illustrated) to prevent double feeding of the document. A separation pad may be adopted instead of the separation roller 15. The feeding roller 14 and the separation roller 15 are provided at a center position in the document width direction (refer to FIG. 4).

The separation roller 15 serving as an example of a separation portion that is disposed to face the feeding roller 14 is movable forward and rearward with respect to the feeding roller 14, and can obtain a separated state where a rotational torque is generated by an operation of a torque limiter (not illustrated) so that the documents can be separated and a non-separated state where the torque limiter is not operated so that the documents are not separated. The separation roller 15 is in the separated state when the apparatus main body 2 is in the normal reading posture, and the separation roller 15 is in the non-separated state when the apparatus main body 2 is in the booklet reading posture.

A first transport roller pair 16 is provided downstream of the feeding roller 14 and the separation roller 15. The first transport roller pair 16 is configured to include a first lower roller 17 provided in the first unit 3 and a first upper roller 18 provided in the second unit 4. The first upper roller 18 is provided to be movable forward and rearward with respect to the first lower roller 17, and is pressed toward the first lower roller 17 by a pressing member (not illustrated), for example, a coil spring. Both the first lower roller 17 and the first upper roller 18 rotate by obtaining power from the transport motor 50 (to be described later). Two first lower rollers 17 and two first upper rollers 18 each are provided to pinch the center position in the document width direction (refer to FIG. 4). When the second unit 4 is closed with respect to the first unit 3, the first lower roller 17 and the first upper roller 18 come into contact. When the second unit 4 is opened with respect to the first unit 3, the first upper roller 18 is separated from the first lower roller 17.

The first reading section 32 and the second reading section 33 are disposed to face each other downstream of the first transport roller pair 16. The first reading section 32 is provided in the first unit 3, and the second reading section 33 is provided in the second unit 4. The first reading section 32 reads a lower surface (first surface) of the document supported by the document support section 11, and the second reading section 33 reads an upper surface (second surface) of the document supported by the document support section 11. The second reading section 33 is provided to be movable forward and rearward with respect to the first reading section 32, and is pressed toward the first reading section 32 by a pressing member (not illustrated), for example, a coil spring. In the present embodiment, the first reading section 32 and the second reading section 33 are configured to include a close contact type image sensor module (CISM). A reference numeral 32a represents a contact glass forming the first reading section 32, and a reference numeral 33a represents a contact glass forming the second reading section 33.

A second transport roller pair 20 is provided downstream of the first reading section 32 and the second reading section 33. The second transport roller pair 20 is configured to include a second lower roller 21 provided in the first unit 3 and a second upper roller 22 provided in the second unit 4. The second upper roller 22 is provided to be movable forward and rearward with respect to the second lower roller 21, and is pressed toward the second lower roller 21 by a pressing member (not illustrated), for example, a coil spring. Both the second lower roller 21 and the second upper roller 22 rotate by receiving power from the transport motor 50 (to be described later). Two second lower rollers 21 and two second upper rollers 22 each are provided to pinch the center position in the document width direction (refer to FIG. 4). When the second unit 4 is closed with respect to the first unit 3, the second lower roller 21 and the second upper roller 22 come into contact. When the second unit 4 is opened with respect to the first unit 3, the second upper roller 22 is separated from the second lower roller 21.

In FIGS. 5 and 6, a one-dot chain line indicated by the reference numeral R1 is a document feeding path, and the document feeding path R1 is from a nipping position of the feeding roller 14 and the separation roller 15 to a nipping position of the first transport roller pair 16. In addition, in FIGS. 5 and 6, a broken line indicated by the reference numeral R2 is a reading transport path, and the reading transport path R2 is from the nipping position of the first transport roller pair 16 to the nipping position of the second transport roller pair 20. The reading transport path R2 is the document transport path facing the first reading section 32 and the second reading section 33.

When the apparatus main body 2 is in the normal reading posture illustrated in FIG. 5, a reversing transport path R3 is formed downstream of the reading transport path R2 when the read document is reversed upward and discharged. The reversing transport path R3 is a downstream document transport path from the nipping position of the second transport roller pair 20, and is the document transport path for curving and reversing the document transported in an obliquely downward direction as illustrated by a two-dot chain line in FIG. 5 and discharging the document in an obliquely upward direction from a first discharge port 37. When the apparatus main body 2 is in the booklet reading posture illustrated in FIG. 6, a non-reversing transport path R4 is formed downstream of the reading transport path R2 when the read document is discharged without reversing the document. The non-reversing transport path R4 is a downstream document transport path from the nipping position of the second transport roller pair 20, and is the document transport path for discharging the document transported in the obliquely downward direction in the reading transport path R2 as illustrated by a two-dot chain line in FIG. 6 in the obliquely downward direction from a second discharge port 38 as it is without curving and reversing the document. The second transport roller pair 20 functions as a discharge roller pair for discharging the document from the non-reversing transport path R4.

The reversing transport path R3 and the non-reversing transport path R4 are switched by a flap 35 serving as a flap member forming a transport path switching unit. The flap 35 is rotatable around a flap rotary shaft 35a, and rotates so that the reversing transport path R3 is coupled to the reading transport path R2, or the non-reversing transport path R4 is coupled to the reading transport path R2. Coupling the reversing transport path R3 to the reading transport path R2 means bringing the reversing transport path R3 into a useable state, and means bringing the non-reversing transport path R4 into an unusable state. Similarly, coupling the non-reversing transport path R4 to the reading transport path R2 means bringing the non-reversing transport path R4 into a useable state, and means bringing the reversing transport path R3 into an unusable state.

In the present embodiment, the flap 35 is configured to rotate in conjunction with posture switching of the apparatus main body 2. A first solenoid 86 (refer to FIG. 8) is adopted in the present embodiment as a configuration in which the flap 35 is rotated in conjunction with the posture switching of the apparatus main body 2. The control section 80 (refer to FIG. 8) that performs various types of control detects a posture of the apparatus main body 2, based on a detection signal of a first posture detection sensor 87 or a second posture detection sensor 88 (to be described later), and the first solenoid 86 is driven to rotate the flap 35, based on a detection result thereof. A unit that rotates the flap 35 is not limited to the first solenoid 86, and other actuators such as a motor may be used. Alternatively, the flap 35 may be configured to mechanically rotate in conjunction with the posture of the apparatus main body 2.

The reversing transport path R3 is provided with a third transport roller pair 24 and a fourth transport roller pair 28. The third transport roller pair 24 is configured to include a third driving roller 25 provided in the third unit 5 and a third driven roller 26 provided in the second unit 4. The third driven roller 26 is provided to be movable forward and rearward with respect to the third driving roller 25, and is pressed toward the third driving roller 25 by a pressing member (not illustrated), for example, a coil spring. The third driving roller 25 is driven by the transport motor 50. The third driven roller 26 is a roller driven to rotate.

The fourth transport roller pair 28 is configured to include a fourth driving roller 29 provided in the third unit 5 and a fourth driven roller 30 provided in the second unit 4. The fourth driven roller 30 is provided to be movable forward and rearward with respect to the fourth driving roller 29, and is pressed toward the fourth driving roller 29 by a pressing member (not illustrated), for example, a coil spring. The fourth driving roller 29 is driven by the transport motor 50. The fourth driven roller 30 is a roller driven to rotate.

Two third driving rollers 25, two third driven rollers 26, two fourth driving rollers 29, and two fourth driven rollers 30 each are provided to pinch the center position in the document width direction (refer to FIG. 3). When the third unit 5 is closed with respect to the second unit 4, the third driving roller 25 and the third driven roller 26 come into contact, and the fourth driving roller 29 and the fourth driven roller 30 also come into contact. When the third unit 5 is opened with respect to the second unit 4, the third driving roller 25 and the third driven roller 26 are separated, and the fourth driving roller 29 and the fourth driven roller 30 are also separated.

The document transported through the reversing transport path R3 is discharged in the obliquely upward direction including a −Y-direction component by the fourth transport roller pair 28, and is supported in an inclined posture by an upper surface 4a of the second unit 4.

Figure 7:
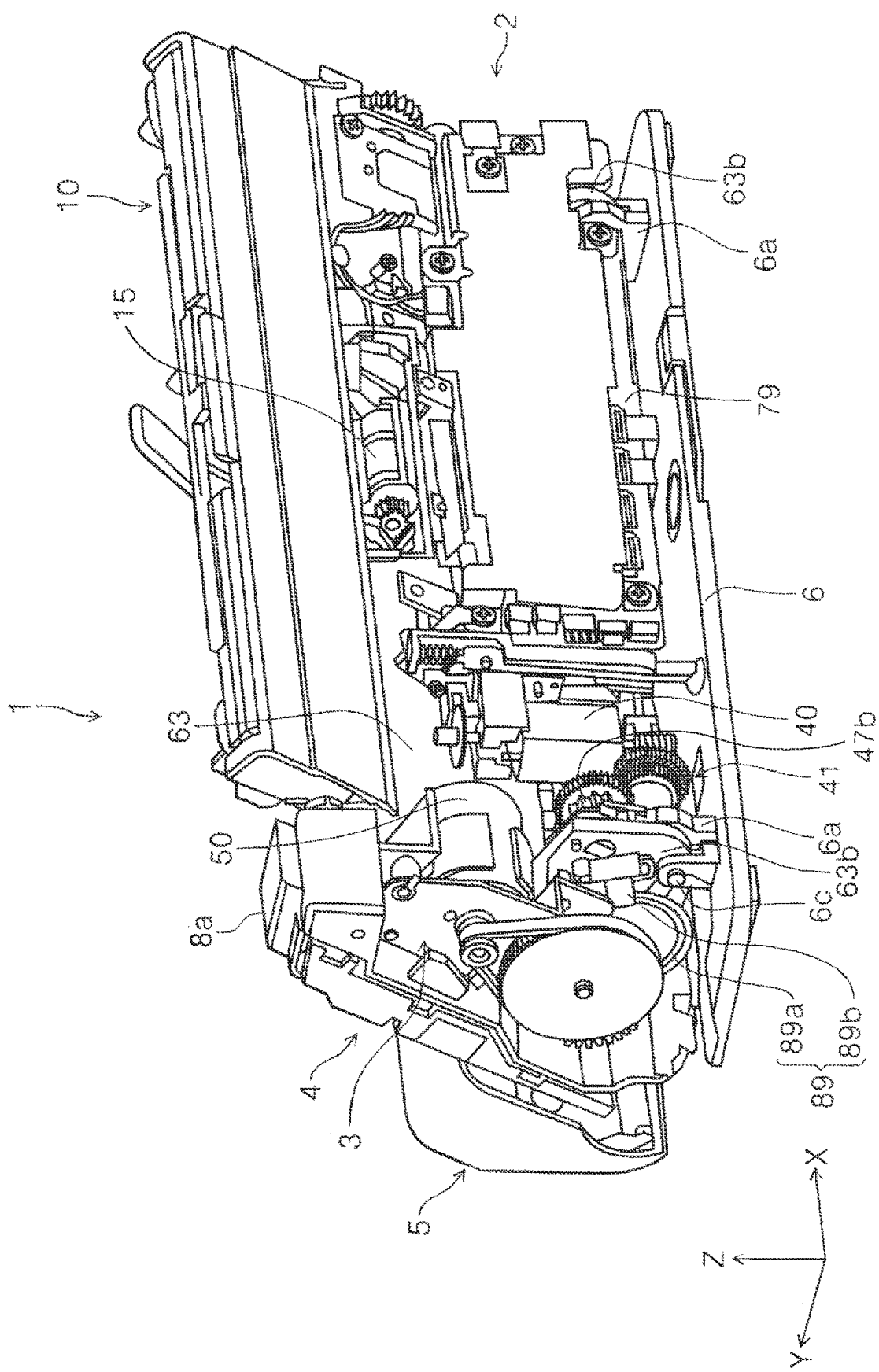
FIG. 7 is a perspective view when the scanner from which a rear surface cover of a first unit is removed is viewed from the rear side.

In the present embodiment, the apparatus main body 2 is rotated by the power of a posture switching motor 40 (refer to FIG. 7) under the control of the control section 80, and switches the posture. The control section 80 controls the posture switching motor 40, based on input information from an external device 500 coupled to the scanner 1. FIG. 7 illustrates a state where a rear surface cover 66 (refer to FIG. 2) forming an appearance of the rear surface of the apparatus is removed. A reference numeral 41 represents a rotation conversion unit that converts the rotation of the posture switching motor 40 into the rotation of the apparatus main body 2. The posture switching motor 40 and the rotation conversion unit 41 are provided closer to a side surface in the −X-direction in the apparatus width direction. In the apparatus width direction, to be closer to the side surface in the −X-direction means to be located closer in the −X-direction than the center position of the apparatus in the X-axis direction.

A first frame 63 forming a base of the first unit 3 is provided with two support target portions 63b at an interval in the X-axis direction. The main body support section 6 is provided with two main body rotary shafts 6c at an interval in the X-axis direction. The first frame 63, that is, the apparatus main body 2, is rotatable around the main body rotary shaft 6c by the main body rotary shaft 6c penetrating the support target portion 63b. The main body rotary shaft 6c is a rotary shaft forming the rotary shaft center parallel to the X-axis direction.

The posture switching motor 40 is provided in the first frame 63. The first frame 63 has a shape along the reading transport path R2. The posture switching motor 40 is provided on the rear surface side of the first frame 63 provided in an inclined posture. The rotation conversion unit 41 includes a gear 47b rotatably provided in the first unit 3 and rotated by the power of the posture switching motor 40, an erected wall portion 6a fixed to the main body support section 6 and provided with a tooth portion meshing with the gear 47b. The tooth portion is formed around the main body rotary shaft 6c of the erected wall portion 6a.

In the configurations of the posture switching motor 40 and the rotation conversion unit 41 described above, a configuration excluding the tooth portion of the erected wall portion 6a is provided in the first unit 3, that is, the apparatus main body 2. Therefore, when the gear 47b is rotated by the power of the posture switching motor 40, the apparatus main body 2 is rotated, and the posture is switched.

The control section 80 (refer to FIG. 8) can detect a posture of the apparatus main body 2, based on a rotation direction of the posture switching motor 40. However, in the present embodiment, the first posture detection sensor 87 and the second posture detection sensor 88 (to be described later) are provided, and the control section 80 can also detect the posture of the apparatus main body 2, based on detection signals of the sensors. The normal reading posture and the booklet reading posture of the apparatus main body 2 are held by supplying electric power to the stopped posture switching motor 40 and setting a holding state.

In the above-described embodiment, the posture of the apparatus main body 2 is switched by the power of the posture switching motor 40. Instead of this configuration or in addition to this configuration, a configuration may be adopted in which a user applies a force to the apparatus main body 2 to switch the posture of the apparatus main body 2.

Figure 8:
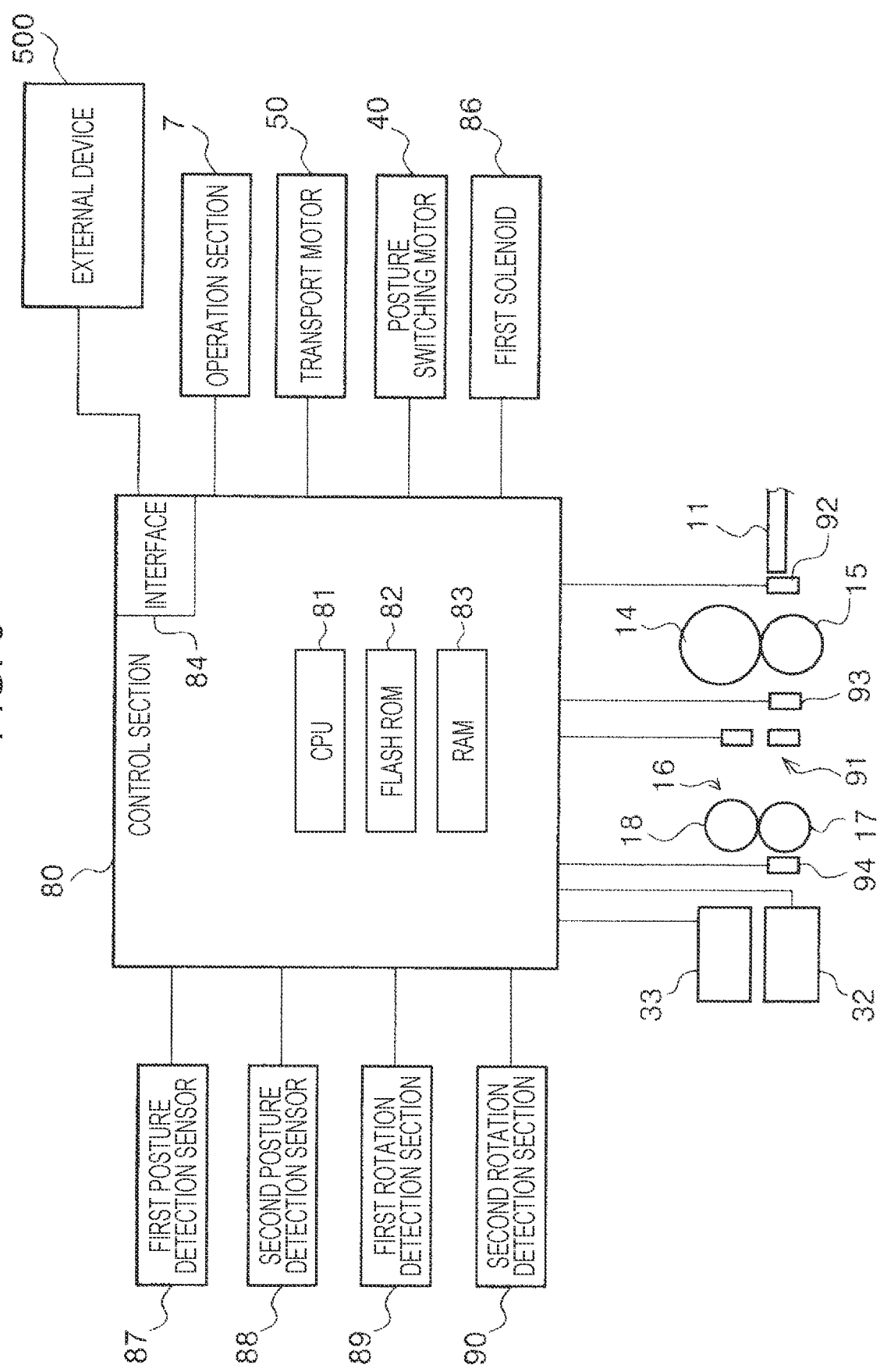
FIG. 8 is a block diagram illustrating a control system of the scanner.

Subsequently, a control system in the scanner 1 will be described with reference to FIG. 8. The control section 80 performs various types of other control for the scanner 1 including feeding, transporting, discharging control, and reading control of the document. A signal from the operation section 7 is input to the control section 80.

The control section 80 controls the transport motor 50 and the posture switching motor 40. In the present embodiment, each motor is a DC motor. Data read from the first reading section 32 and the second reading section 33 is input to the control section 80, and a signal for controlling each reading section is transmitted from the control section 80 to each reading section. Signals from detection units such as a placement detection section 92, a double feeding detection section 91, a first document detection section 93, a second document detection section 94, a first posture detection sensor 87, a second posture detection sensor 88, a first rotation detection section 89, and a second rotation detection section 90 are also input to the control section 80.

As illustrated in FIG. 7, the first rotation detection section 89 is a detection section provided in an end portion in the −X-direction in the apparatus main body 2. The control section 80 can recognize a rotation amount of each roller provided in the document transport path by causing the first rotation detection section 89 to detect a rotation amount of the transport motor 50. The first rotation detection section 89 is a rotary encoder including a rotary disk 89a and a detection section 89b. The second rotation detection section 90 is a rotary encoder including a rotary disk provided on the rotary shaft 40a of the posture switching motor 40 and the detection section. The control section 80 can recognize the rotation direction and the rotation amount of the posture switching motor 40 by causing the second rotation detection section 90 to detect the rotation amount of the posture switching motor 40.

The control section 80 includes a CPU 81, a flash ROM 82, and a RAM 83. The CPU 81 performs various arithmetic processes in accordance with a program stored in the flash ROM 82, and controls an operation of the whole scanner 1. The flash ROM 82 serving as an example of a storage unit is a non-volatile memory that can be read and written. Various types of information are temporarily stored in the RAM 83 serving as an example of the storage unit. An interface 84 included in the control section 80 is configured to include a first coupling portion 71 and a second coupling portion 72 which are described with reference to FIG. 2. The control section 80 transmits and receives data to and from the external device 500 via the interface 84.

Next, each of other detection sections will be described. The placement detection section 92 is a detection section provided upstream of the feeding roller 14. The control section 80 can detect the presence or absence of the document on the document support section 11 by using a signal transmitted from the placement detection section 92. The first document detection section 93 is a detection section provided between the feeding roller 14 and the first transport roller pair 16. The control section 80 can detect whether a leading end or a trailing end of the document passes through a detection position by using a signal transmitted from the first document detection section 93.

The double feeding detection section 91 is a detection section provided between the feeding roller 14 and the first transport roller pair 16, and includes an ultrasonic transmission section and an ultrasonic reception section which are disposed to face each other across the document feeding path R1. The control section 80 can detect double feeding of the documents by using a signal transmitted from the double feeding detection section 91. The second document detection section 94 is a detection section provided between the first transport roller pair 16 and the first reading section 32 and the second reading section 33, and the control section 80 can detect whether the leading end or the trailing end passes through the detection position by using a signal transmitted from the second document detection section 94.

Figure 9:
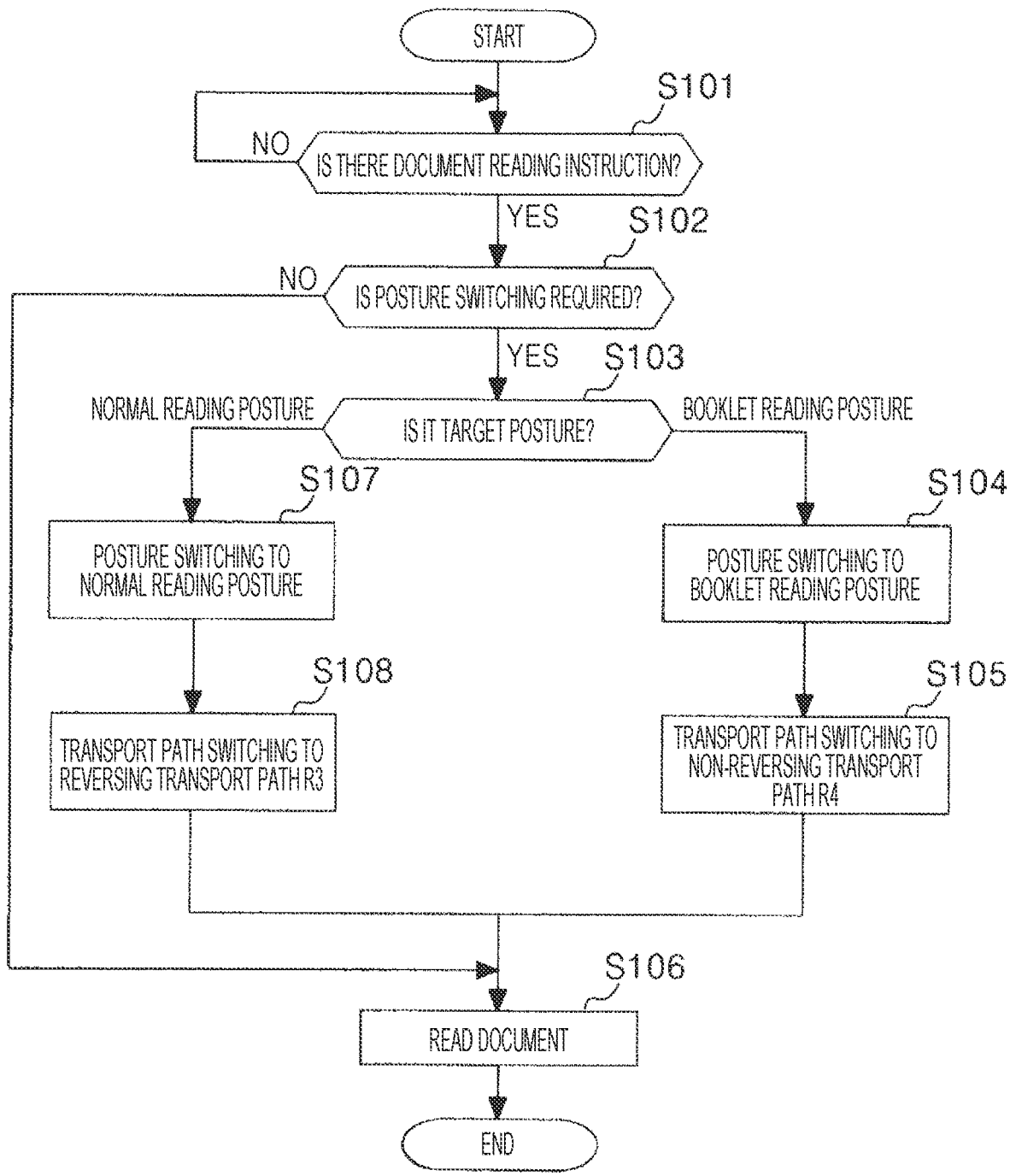
FIG. 9 is a flowchart illustrating control when a posture of the apparatus main body is switched.

Next, an example of a process performed by the control section 80 will be described with reference to FIG. 9. FIG. 9 is a flowchart illustrating the process of the control section 80 during posture switching of the apparatus main body 2. In FIG. 9, when the control section 80 receives a document reading instruction (Yes: Y in Step S101), the control section 80 determines whether or not the posture switching of the apparatus main body 2 is required (Step S102). Here, it is assumed that the document reading instruction is received from then external device 500 (refer to FIG. 8) as an example. A type of the document to be read can be set in the external device 500. When the type of the document to be read is a card-shaped document or a booklet-shaped document, the control section 80 sets the posture of the apparatus main body 2 as the booklet reading posture. When the type of document to be read is a sheet-shaped document, the control section 80 sets the posture of the apparatus main body 2 as the normal reading posture.

In Step S102, it is determined whether or not to switch the posture of the apparatus main body 2 by comparing the acquired type of the document with a current posture of the apparatus main body 2. As a result, when the posture switching is not required (No: N in Step S102), the document is read without performing posture switching control (Step S106). When the posture switching is required (Yes: Y in Step S102), the control section 80 switches the posture of the apparatus main body 2 to the booklet reading posture, based on a target posture (Step S103), when the target posture is the booklet reading posture (Step S104), and switches the document transport path to the non-reversing transport path R4 (Step S105). Steps S104 and S105 may be performed at the same time. Thereafter, the document is read (Step S106).

In addition, based on the target posture (Step S103), the control section 80 switches the posture of the apparatus main body 2 to the normal reading posture when the target posture is the normal reading posture (Step S107), and switches the document transport path to the reversing transport path R3 (Step S108). Steps S107 and S108 may be performed at the same time. Thereafter, the document is read (Step S106). When the apparatus main body 2 is in the normal reading posture, detection information of the double feeding detection section 91 is preferably validated, and when the apparatus main body 2 is in the booklet reading posture, detection information of the double feeding detection section 91 is preferably invalidated.

As described above, the scanner 1 includes the main body support section 6 placed on the placement surface G of the apparatus, and the apparatus main body 2 supported by the main body support section 6. The apparatus main body 2 includes the reading transport path R2 serving as the document transport path for transporting the document and facing the first reading section 32 and the second reading section 33 for reading the document, the reversing transport path R3 serving as the document transport path downstream from the reading transport path R2 and reversing the read document upward and discharging the document, and non-reversing transport path R4 serving as the document transport path downstream from the reading transport path R2 and discharging the read document without reversing the document. In addition, the apparatus main body 2 includes the flap 35 for switching the document transport path coupled to the reading transport path R2 to either the reversing transport path R3 or the non-reversing transport path R4.

The apparatus main body 2 is rotatably attached to the main body support section 6, and rotates to be capable of switching between the normal reading posture (FIG. 5) and the booklet reading posture (FIG. 6) in which an angle formed by the reading transport path R2 and the placement surface G is smaller than an angle of the normal reading posture. The flap 35 couples the reading transport path R2 to the reversing transport path R3 when the apparatus main body 2 adopts the normal reading posture, and couples the reading transport path R2 to the non-reversing transport path R4 when the apparatus main body 2 adopts the booklet reading posture.

The scanner 1 can satisfactorily transport the document which is less likely to bend by using the non-reversing transport path R4. The document which is less likely to bend includes a booklet and a card. The flap 35 couples the reading transport path R2 to the reversing transport path R3 when the apparatus main body 2 adopts the normal reading posture, and couples the reading transport path R2 to the non-reversing transport path R4 when the apparatus main body 2 adopts the booklet reading posture. In this manner, a discharging direction of the document can be set to a direction along the placement surface G, compared to discharging the document by using the non-reversing transport path R4 when the normal reading posture is adopted. As a result, the document having a larger size can be discharged, compared to a form in which the document is discharged by using the non-reversing transport path R4 when the normal reading posture is adopted. In addition, since the apparatus main body 2 adopts the normal reading posture, an angle formed by the reading transport path R2 and the placement surface G can be increased, compared to an angle of the booklet reading posture, and the footprint of the apparatus main body 2 can be prevented.

In addition, the posture switching of the apparatus main body 2 may be configured by using buttons forming the operation section 7. For example, when one of the buttons forming the operation section 7 is assigned to a posture switching button and the posture switching button is pressed by a user when the current posture is the normal reading posture, the control section 80 performs Steps S104 and S105. In addition, when the posture switching button is pressed by the user when the current posture is the booklet reading posture, the control section 80 controls the posture switching motor 40 to perform Steps S107 and S108.

Figure 10:
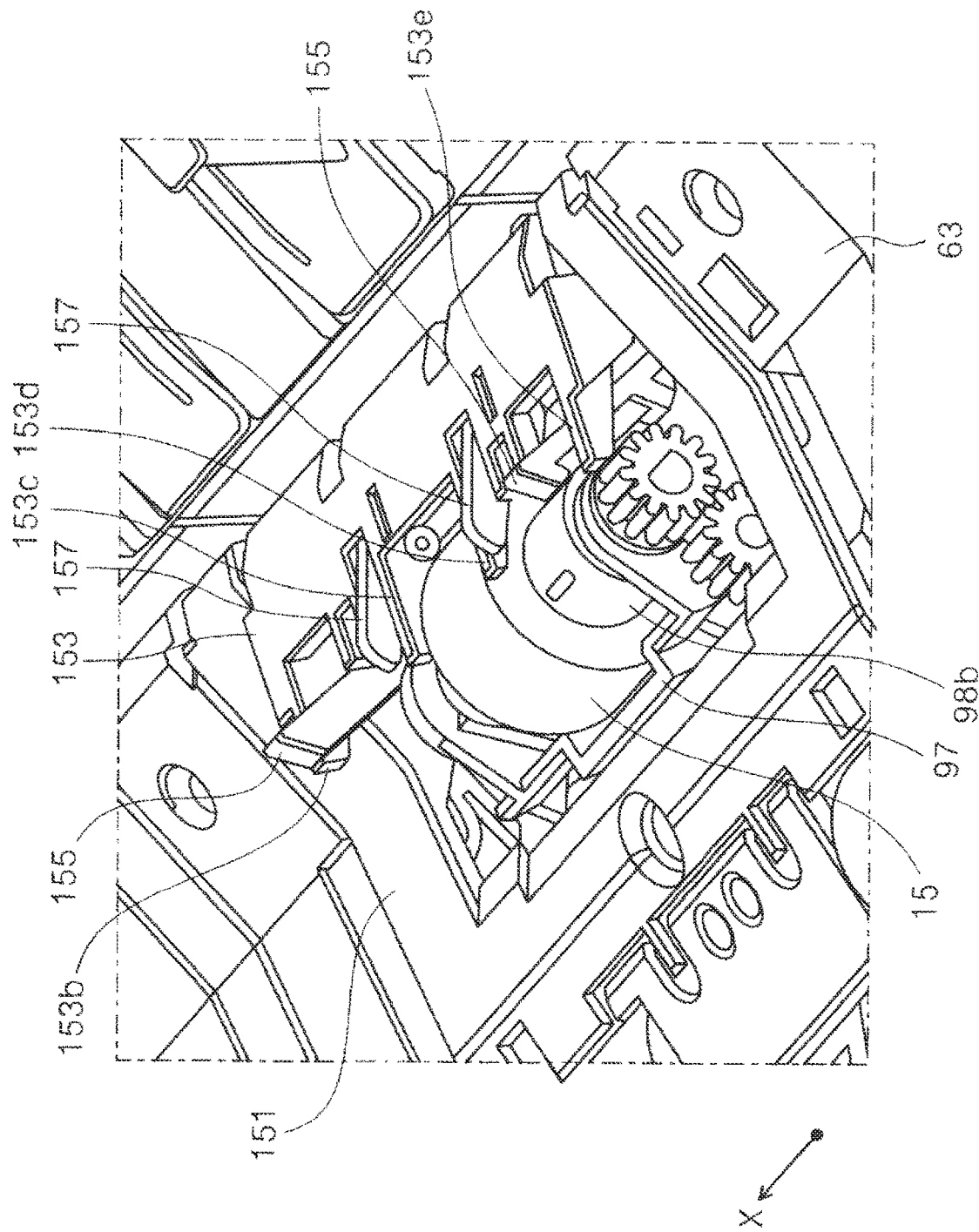
FIG. 10 is a perspective view illustrating a configuration around a separation roller.

Subsequently, configurations around the feeding roller 14 and the separation roller 15 will be described in detail with reference to FIGS. 10, the subsequent drawings, and other drawings when necessary. As illustrated in FIG. 10, a guide member 151, a set guide 153, a set flap 155, and a pressing lever 157 are provided around the separation roller 15. The set guide 153 and the guide member 151 are examples of a path forming member. The pressing lever 157 is an example of a pressing member.

A recess portion 63m (refer to FIG. 11) is formed upstream in the feeding direction in the first frame 63 and at a center portion in the X-axis direction. The recess portion 63m is provided with the separation roller 15, the guide member 151, the set guide 153, the set flap 155, and the pressing lever 157. The guide member 151 is a frame-shaped member, and the separation roller 15, the set guide 153, the set flap 155, and the pressing lever 157 are in a state of being disposed inside the guide member 151. The guide member 151 is provided to be attachable to and detachable from the first frame 63 by a snap-fit structure (not illustrated), and forms a portion of the document feeding path in a mounted state.

Figure 11:
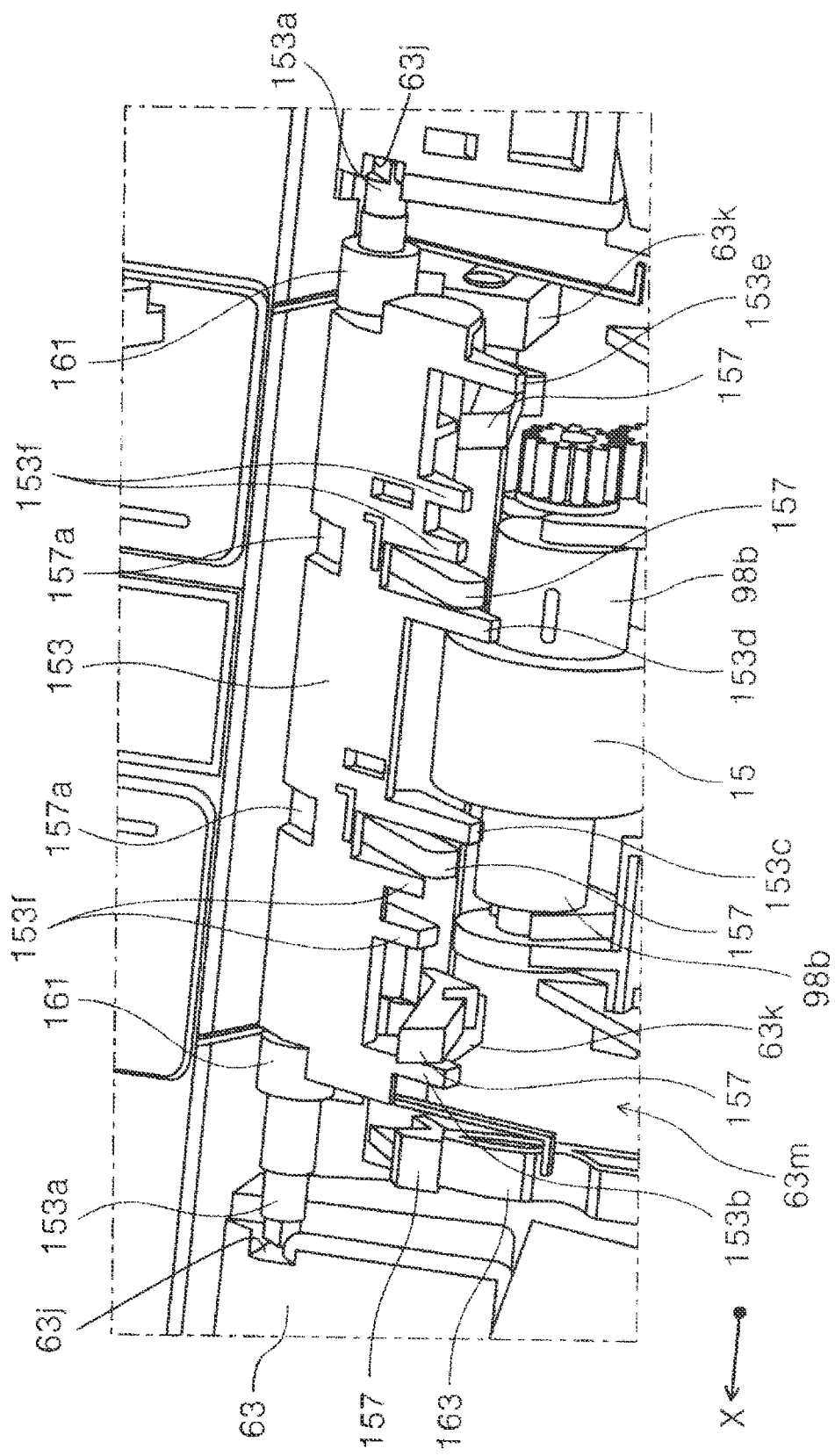
FIG. 11 is a view illustrating a state where a guide member is detached from a state in FIG. 10.
Figure 12:
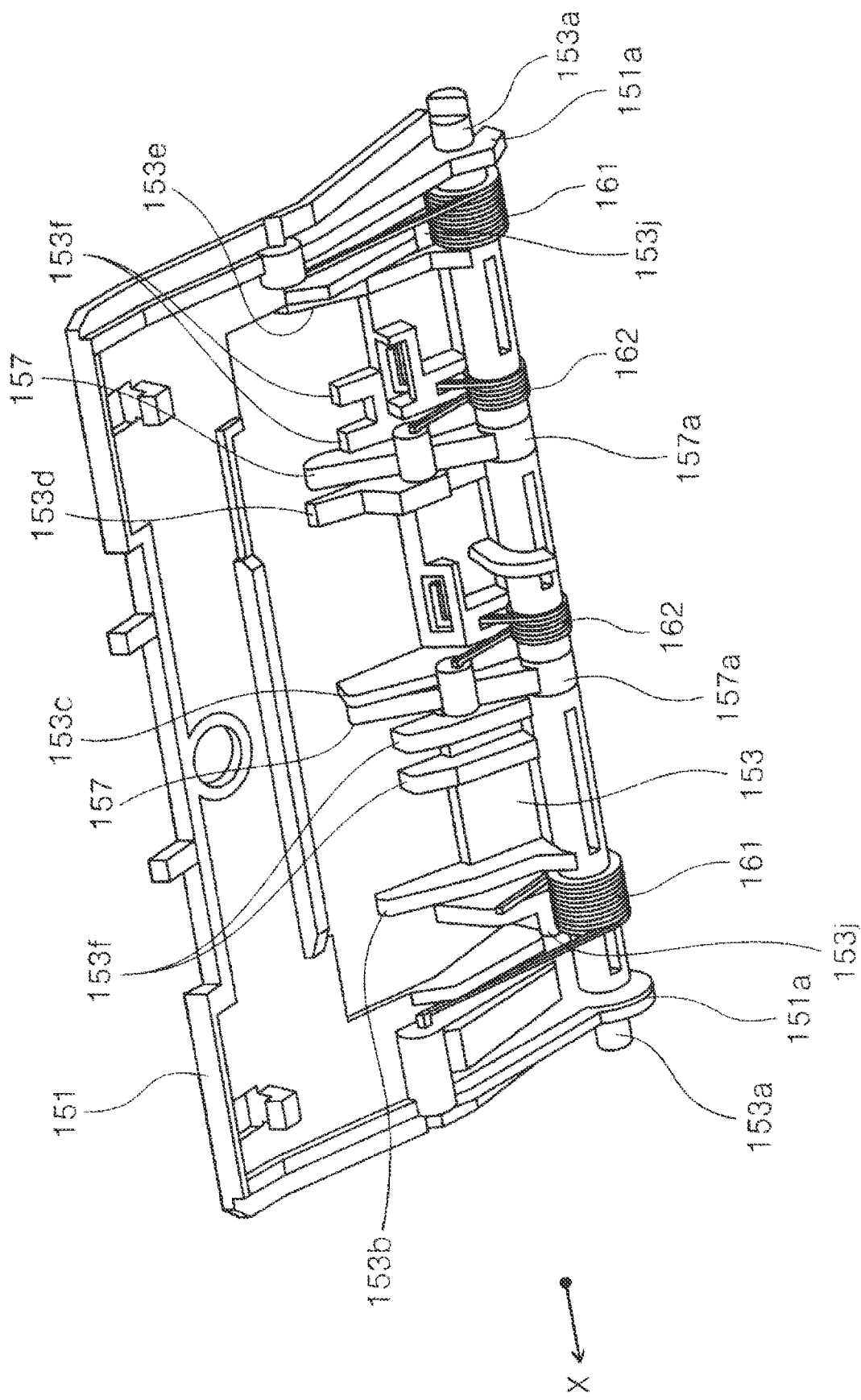
FIG. 12 is a perspective view when a guide member, a set guide, and a pressing lever are viewed from a lower side.
Figure 14:
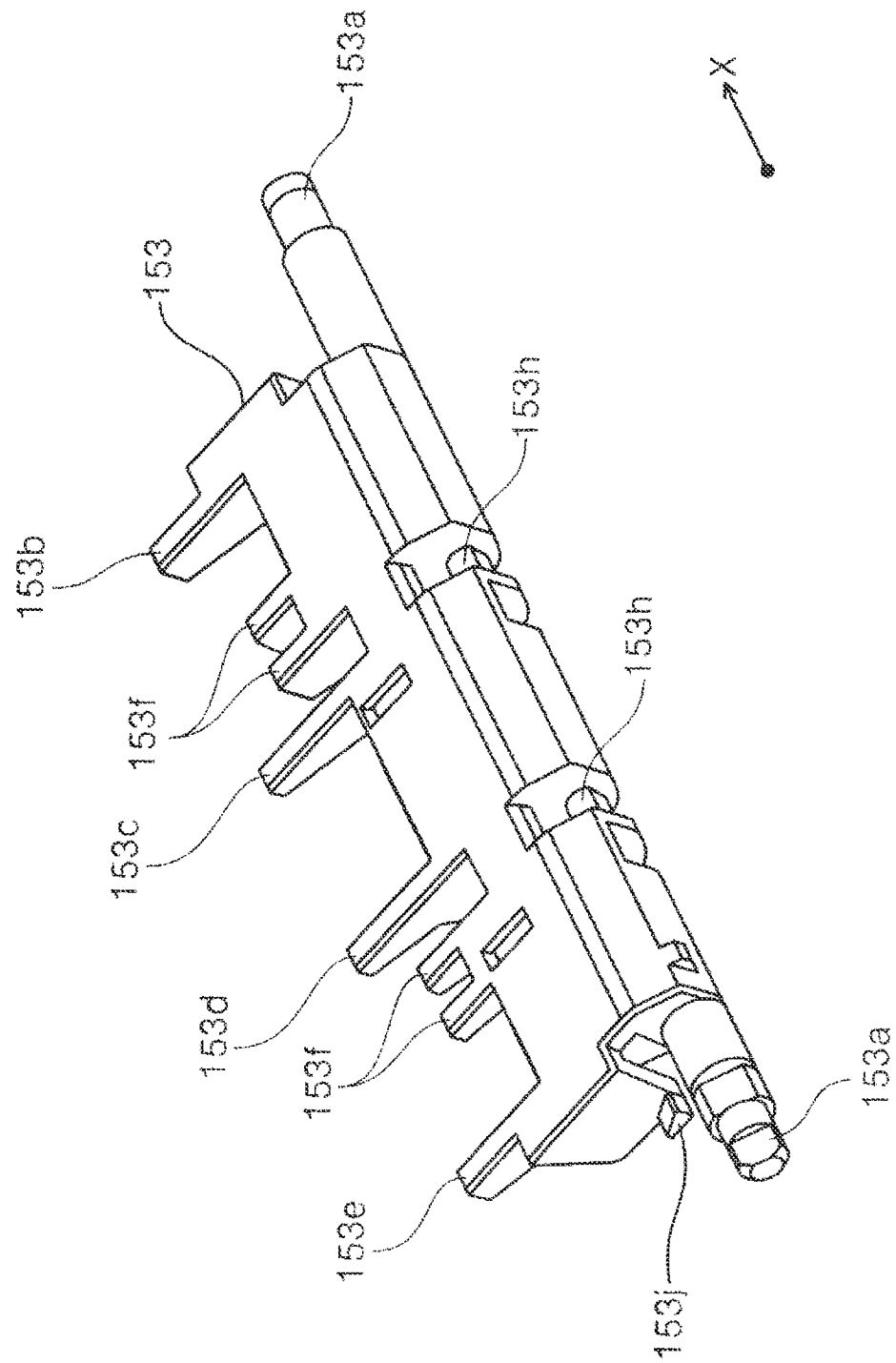
FIG. 14 is a perspective view of the set guide.

As illustrated in FIG. 14, the set guide 153 has rotary shafts 153a on both sides in the X-axis direction. As illustrated in FIG. 12, bearing portions 151a are formed on both sides of the guide member 151 in the X-axis direction, and the rotary shaft 153a of the set guide 153 is pivotally supported to be rotatable by the bearing portions 151a. As illustrated in FIG. 11, restricting structures 63j are formed on both sides of the recess portion 63m of the first frame 63 in the X-axis direction. When the guide member 151 is mounted on the first frame 63, the movement of the rotary shaft 153a of the set guide 153 is restricted in the feeding direction by the restricting structures 63j.

First springs 161 serving as an example of a first pressing portion are provided on both sides of the set guide 153 in the X-axis direction. The first spring 161 is a torsion coil spring in the present embodiment, and generates a pressing force between the guide member 151 and the set guide 153. The set guide 153 is pressed by the first spring 161 in a rotation direction (clockwise direction in FIG. 16) in which the downstream in the feeding direction is directed toward the feeding roller 14 around the rotary shaft 153a.

Figure 16:
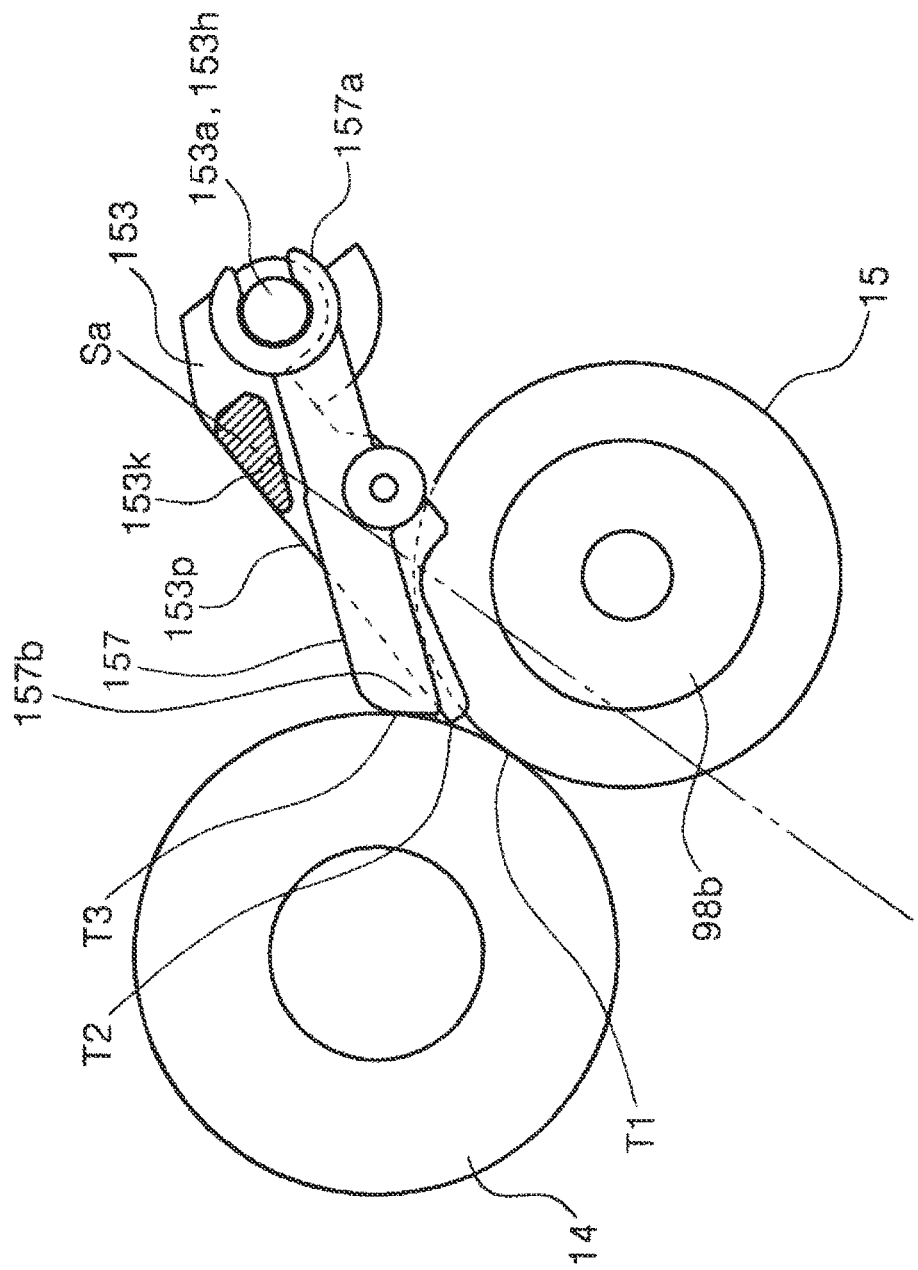
FIG. 16 is a side sectional view illustrating a configuration around the separation roller.

As illustrated in FIGS. 12 and 14, abutting portions 153j are formed on both side surfaces of the set guide 153 in the X-axis direction, and the abutting portions 153j abut on a lower side of the guide member 151 to restrict the rotation of the set guide 153 (rotation in the clockwise direction in FIG. 16). As illustrated in FIG. 4, in a state where the second unit 4 is opened with respect to the first unit 3, the abutting portion 153j abuts on the lower side of the guide member 151. When the second unit 4 is closed with respect to the first unit 3 from this state, the feeding roller 14 abuts on long ribs 153c and 153d of the set guide 153. In this manner, the set guide 153 is rotated by a predetermined amount in a counterclockwise direction in FIG. 16. In this state, the abutting portion 153j is separated from the lower side of the guide member 151.

A plurality of ribs extending in the document feeding direction are formed at a predetermined interval in the X-axis direction in the set guide 153. The plurality of ribs are configured to include long ribs 153b, 153c, 153d, and 153e, and four short ribs 153f which are shorter in length in the document feeding direction than the long ribs. The two short ribs 153f are formed between the long rib 153b and the long rib 153c, and between the long rib 153d and the long rib 153e.

Figure 13:
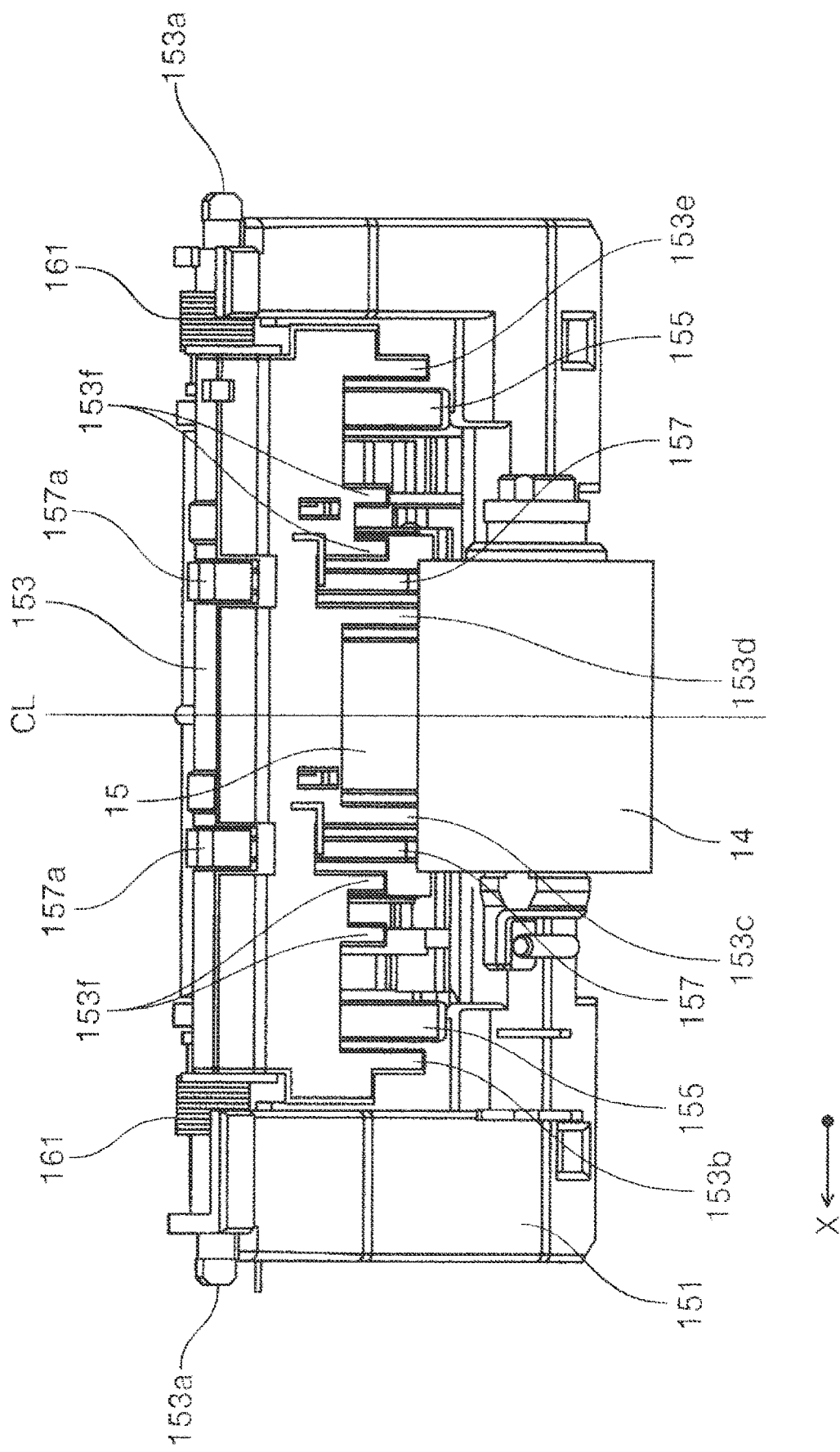
FIG. 13 is a plan view illustrating a configuration around the separation roller.

In FIG. 13, a straight line CL is a straight line passing through the center of the document in the X-axis direction, and is a straight line parallel to the document feeding direction. The plurality of ribs are disposed to be line-symmetric with respect to the straight line CL. Specifically, the long rib 153b and the long rib 153e are disposed to be line-symmetric with respect to the straight line CL, and the long rib 153c and the long rib 153d are disposed to be line-symmetric with respect to the straight line CL. In addition, the two short ribs 153f located in the +X-direction with respect to the straight line CL and the two short ribs 153f located in the −X-direction are disposed to be line-symmetric with respect to the straight line CL. The ribs may not be necessarily disposed to be line-symmetric with respect to the straight line CL.

The long rib 153c and the long rib 153d are formed at positions which can abut on a cylindrical portion 98b forming an outer periphery of a torque limiter, and when the set guide 153 rotates in the counterclockwise direction in FIG. 16, the long ribs 153c and 153d are configured to be capable of abutting on the cylindrical portion 98b.

Two shaft portions 153h are formed in the set guide 153 as illustrated in FIG. 14, and a pressing lever 157 is pivotally supported by the shaft portions 153h as illustrated in FIG. 12. A reference numeral 157a represents a shaft fitting portion fitted to the shaft portion 153h in the pressing lever 157. In the present embodiment, a rotation center position of the pressing lever 157 coincides with a rotation center position of the set guide 153. The rotation center position of the pressing lever 157 and the rotation center position of the set guide 153 may be configured to be different. A second spring 162 serving as an example of a second pressing portion is provided at a position adjacent to the pressing lever 157. The second spring 162 is a torsion coil spring in the present embodiment, and generates a pressing force between the pressing lever 157 and the set guide 153. The pressing lever 157 is pressed by the second spring 162 in a rotation direction (clockwise direction in FIG. 16) in which the downstream in the feeding direction is directed toward the feeding roller 14 around the shaft portion 153h. That is, the pressing lever 157 is pressed by the second spring 162 in a direction in which a tip portion 157b is directed toward the feeding roller 14.

An abutting portion 153k is formed in the set guide 153 as illustrated in FIG. 16. The pressing lever 157 abuts on the abutting portion 153k, thereby restricting the rotation (rotation in the clockwise direction in FIG. 16) of the pressing lever 157. As illustrated in FIG. 4, in a state where the second unit 4 is opened with respect to the first unit 3, the pressing lever 157 abuts on the abutting portion 153k. When the second unit 4 is closed with respect to the first unit 3 from this state, the feeding roller 14 abuts on the pressing lever 157. In this manner, the pressing lever 157 is rotated by a predetermined amount in the counterclockwise direction in FIG. 16. The abutting portion 153k restricts a rotation limit of the pressing lever 157 in a state where the second unit 4 is opened. In this manner, the pressing lever 157 can be properly rotated when the second unit 4 is closed. In this state, as illustrated in FIG. 16, the pressing lever 157 is slightly separated from the abutting portion 153k.

As illustrated in FIGS. 11, 12, and 13, one of the two pressing levers 157 protrudes toward the document feeding path between the long rib 153c in the set guide 153 and the short rib 153*f* located in the +X-direction with respect to the long rib 153*c*. In addition, the other of the two pressing levers 157 protrudes toward the document feeding path between the long rib 153*d* in the set guide 153 and the short rib 153*f* located in the −X-direction with respect to the long rib 153*d*. In addition, as illustrated in FIG. 13, the two pressing levers 157 are disposed at positions which are line-symmetric with respect to the straight line CL. In addition, each of the two pressing levers 157 can independently rotate. In addition, the two pressing levers 157 are located in a region of the feeding roller 14 in the X-axis direction, and are located in both end portions of the feeding roller 14.

Figure 15:
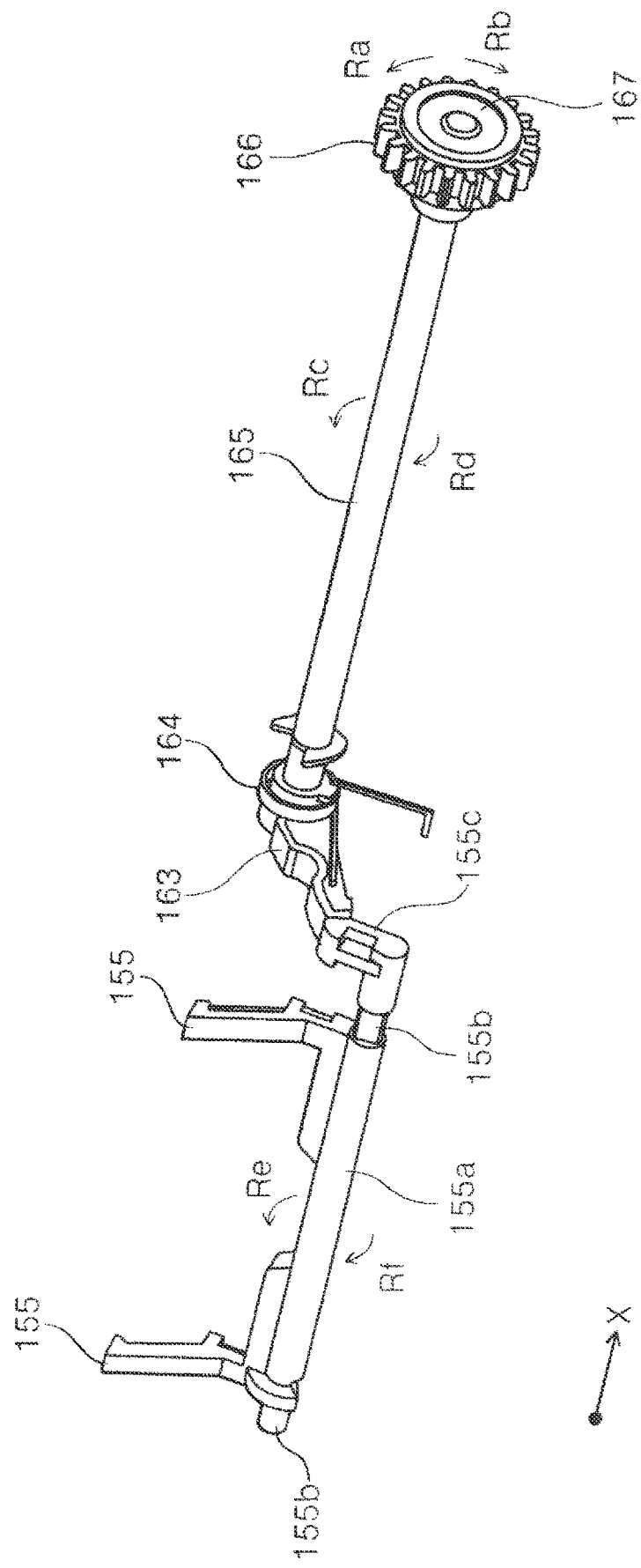
FIG. 15 is a perspective view illustrating a set flap and a portion of a mechanism for driving the set flap.

Next, the set flaps 155 each are disposed between the long rib 153*b* of the set guide 153 and the short rib 153*f* adjacent to the long rib 153*b*, and between the long rib 153*e* and the short rib 153*f* adjacent to the long rib 153*e*. As illustrated in FIG. 15, the two set flaps 155 are provided in a substantially shaft-shaped base portion 155*a* extending in the X-axis direction, and are integrally rotated. Shaft portions 155*b* are formed on both sides of the base portion 155*a* in the X-axis direction, and the shaft portion 155*b* serves as a rotary shaft of the set flap 155. As illustrated in FIG. 11, the shaft portion 155*b* is supported to be rotatable by a bearing portion 63*k* formed in the recess portion 63*m* of the first frame 63.

In FIG. 15, a cam follower portion 155*c* is formed in the +X-direction with respect to the shaft portion 155*b* in the +X-direction. A set flap cam 163 is provided to be capable of abutting on the cam follower portion 155*c*. The set flap cam 163 is fixed to an end portion of the shaft 165 in the −X-direction, and a gear 166 is provided in an end portion of a shaft 165 in the +X-direction via a one-way clutch 167. A driving force of the transport motor 50 (refer to FIG. 12) is transmitted to the gear 166, and the gear 166 is rotated in accordance with the rotation of the transport motor 50. The power of the transport motor 50 is transmitted to the shaft 165 via the gear 166 and the one-way clutch 167.

The set flap cam 163 is provided with a spring 164. The spring 164 applies a pressing force to a first spring hooking portion (not illustrated) and the set flap cam 163. In this manner, the pressing force in a direction of an arrow Rc acts on the set flap cam 163, that is, the shaft 165. FIG. 15 illustrates a feeding standby state. In this state, the cam follower portion 155*c* abuts on the set flap cam 163, and the set flap 155 is brought into a state of blocking the document feeding path. In this state, the leading end of the document to be set abuts on the set flap 155, and entering a space between the feeding roller 14 and the separation roller 15 is restricted. In this state, the rotation of the set flap cam 163, that is, the shaft 165 is restricted in the direction of the arrow Rc by the action of the one-way clutch 167. In addition, the gear 166 is stopped by a load in a power transmission path formed between the gear 166 and the transport motor 50.

From this state, when the transport motor 50 rotates forward and the gear 166 rotates in a direction of an arrow Ra, the shaft 165 rotates in the direction of arrow Rc due to the pressing force of the spring 164, that is, the set flap cam 163 rotates in the direction of the arrow Rc. In this manner, the set flap cam 163 is removed from the cam follower portion 155*c*, the set flap 155 rotates in a direction of an arrow Rf, and the set flap 155 retracts from the document feeding path. When the set flap 155 retracts from the document feeding path, the set document can be directed between the feeding roller 14 and the separation roller 15. Due to the forward rotation of the transport motor 50, each roller provided in the document transport path rotates in a direction in which the document is transported downstream.

At this time, the gear 166 in FIG. 15 continues to rotate in the direction of the arrow Ra. However, a torque of the transport motor 50 is not transmitted to the shaft 165 due to the action of the one-way clutch 167.

When the transport motor 50 rotates rearward in a state where the set flap 155 retracts from the document feeding path, the gear 166 rotates in a direction of an arrow Rb in FIG. 15. When the gear 166 rotates in the direction of the arrow Rb, a torque in a direction of an arrow Rd is transmitted to the shaft 165 by the action of the one-way clutch 167. In this manner, the shaft 165, that is, the set flap cam 163 rotates in the direction of the arrow Rd against the pressing force of the spring 164, presses up the cam follower portion 155*c*, and the set flap 155 rotates in a direction of an arrow Re to return to a state illustrated in FIG. 15.

The above-described configuration is the configuration around the separation roller 15. Hereinafter, the set guide 153 will be further described. FIG. 16 illustrates a state immediately before the feeding of the document starts (feeding start state). A reference numeral T1 represents a contact position between the feeding roller 14 and the separation roller 15, and is a contact position when it is assumed that both rollers are not elastically deformed. A reference numeral T2 represents a contact position between the set guide 153 and the feeding roller 14, and a reference numeral T3 represents a contact position between the tip portion 157*b* of the pressing lever 157 and the feeding roller 14. As illustrated, the contact position T2 is located upstream of the contact position T1 in the feeding direction, and the contact position T3 is located upstream of the contact position T2 in the feeding direction. A reference numeral Sa represents a path forming surface formed by an upper surface of the first frame 63.

Figure 17A:
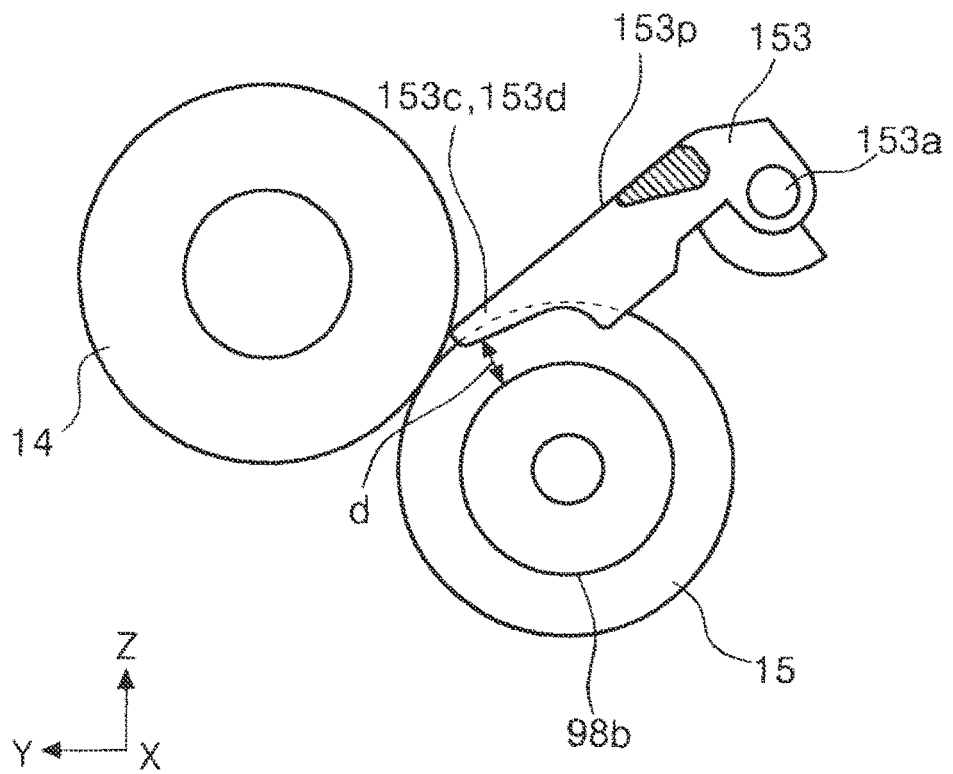
FIGS. 17A and 17B are views for describing an operation of the set guide.
Figure 17B:
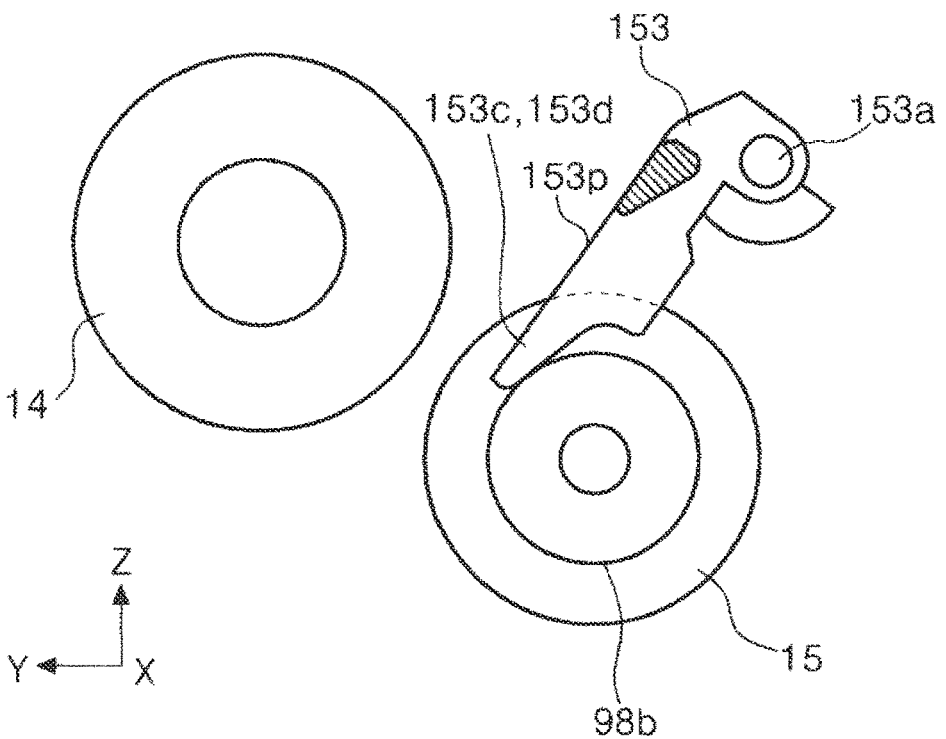

In FIGS. 17A, 17B, 18A, and 18B, in order to avoid complication of the drawings, the set flap 155 and the pressing lever 157 are omitted in the drawing. FIG. 17A is a view corresponding to FIG. 16. In this feeding start state, unless a thick medium such as a booklet-shaped document is used, a gap d is formed between the long ribs 153*c* and 153*d* of the set guide 153 and the cylindrical portion 98*b*. In addition, since the set guide 153 moves forward to the feeding roller 14, the document feeding path R1 toward the contact position T1 is narrowed. When the thickness of the document to be set in the set guide 153 exceeds a predetermined thickness, the gap d disappears, and as illustrated in FIG. 17B, the cylindrical portion 98*b*, that is, the separation roller 15 is pressed down by the long rib 153*d*. In this manner, the separation roller 15 is separated from the feeding roller 14. The above-described configuration is engagement between the set guide 153 and the separation roller 15. In the present embodiment, in a state where the document is not set in the document support section 11 or in a state where the document is set in the document support section 11 but still in a feeding standby state, the document is brought into a state illustrated in FIG. 23B (to be described late) or in FIG. 24C.

Figure 18A:
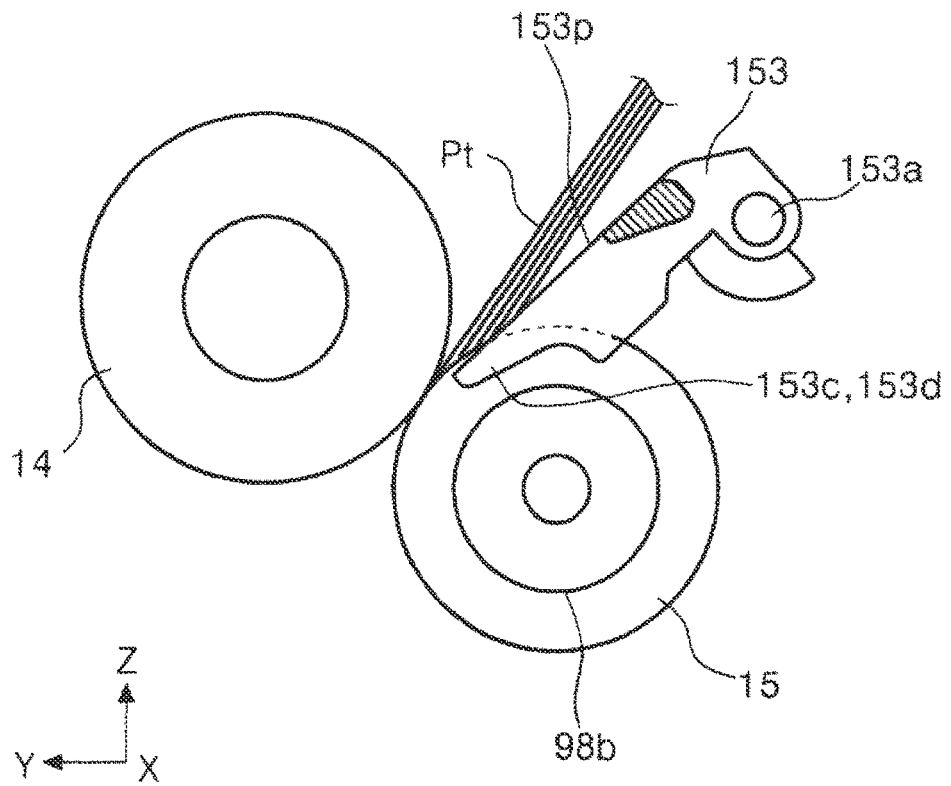
FIGS. 18A and 18B are views for describing an operation of the set guide.

FIG. 18A illustrates a feeding start state when a plurality of sheet-shaped documents Pt are placed. In this state, the long ribs 153*c* and 153*d* are separated from the cylindrical portion 98*b*, and the separation roller 15 is not pressed down. As an example, when the thickness of a document bundle of the sheet-shaped documents Pt is shorter than 2 mm, the long ribs 153*c* and 153*d* do not come into contact with the cylindrical portion 98*b*. In this state, an upper surface 153*p* of the set guide 153 applies a preliminary separation action to the leading end of the document Pt. The upper surface 153*p* of the set guide 153 is formed on the upper surface of the whole set guide 153 including the long ribs 153b, 153c, 153d, and 153e and the short rib 153f which are described above.

Figure 18B:
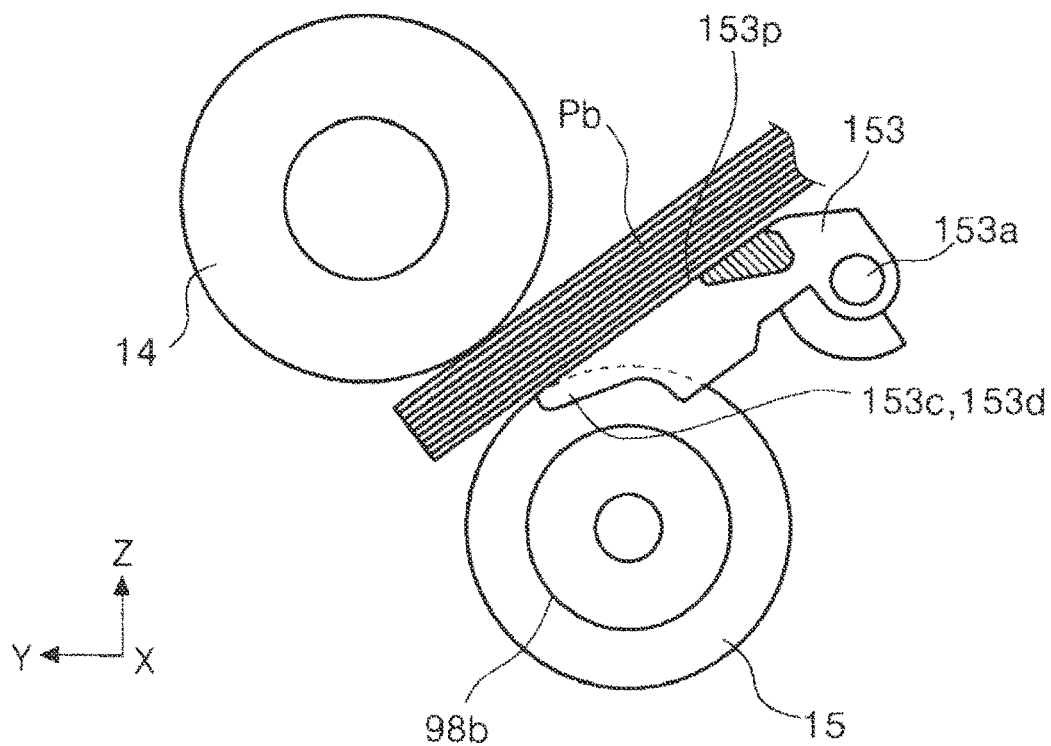

FIG. 18B illustrates a state where a booklet-shaped document Pb is fed after being placed. In a process leading to this state, the set guide 153 is pressed down by the booklet-shaped document Pb, the long ribs 153c and 153d abut on the cylindrical portion 98b, the separation roller 15 is pressed down, and a gap is formed between the feeding roller 14 and the separation roller 15. As an example, when the thickness of the booklet-shaped document Pb is 2 mm or longer, the long ribs 153c and 153d come into contact with the cylindrical portion 98b. When the booklet-shaped document Pb is transported by the feeding roller 14, the separation roller 15 is pressed down by the booklet-shaped document Pb. When the booklet-shaped document Pb is nipped and transported by the feeding roller 14 and the separation roller 15, it is preferable that the long ribs 153c and 153d are separated from the cylindrical portion 98b as illustrated in FIG. 18B. Since the separation roller 15 is not pressed down by the set guide 153, the separation roller 15 can stably nip the booklet-shaped document Pb with the feeding roller 14.

As described above, the scanner 1 or the document feeding device 150 includes the set guide 153 located upstream in the document feeding direction with respect to the contact position T1 between the feeding roller 14 and the separation roller 15. The set guide 153 can move forward and rearward with respect to the feeding roller 14 in accordance with the thickness of the document, and moves forward with respect to the feeding roller 14 to narrow the document feeding path R1 directed toward the contact position T1. The set guide 153 can engage with the separation roller 15, and displaces the separation roller 15 in a direction separated from the feeding roller 14 when the document having the thickness exceeding a predetermined thickness is pressed down in a direction retracting from the feeding roller 14. When the document having the thickness exceeding the predetermined thickness is fed in this way, the separation roller 15 is separated from the feeding roller 14 in advance before the document enters between the separation roller 15 and the feeding roller 14. Therefore, it is possible to prevent a possibility that the document having the thickness exceeding the predetermined thickness may be unable to be fed after colliding with the separation roller 15.

In addition, as illustrated in FIG. 18A, when the plurality of sheet-shaped documents Pt are supported by the document support section 11, the upper surface of the set guide 153 applies a separating action to the leading end of the document Pt. In this manner, the document Pt is separated by the set guide 153 before the document Pt is separated by the feeding roller 14 and the separation roller 15. In this manner, the document Pt can be more reliably separated.

In addition, the set guide 153 includes a plurality of long ribs (153b, 153c, 153d, 153e, and 153f) extending in the document feeding direction as described with reference to FIGS. 11 to 13. The plurality of ribs are disposed to be line-symmetric with respect to the straight line CL parallel to the document feeding direction which is a straight line passing through the center of the document, in the width direction (X-axis direction) which is a direction intersecting with the document feeding direction. In this manner, a frictional force applied to the document by the set guide 153 becomes laterally even with respect to the straight line CL in the width direction. In this manner, an oblique motion of the document can be prevented.

In addition, in the width direction, the straight line CL passes through the center position of the feeding roller 14 and the center position of the separation roller 15. The long ribs 153c and 153d serving as two ribs close to the straight line in the plurality of ribs are located across the separation roller 15 in the width direction, and are located in a region of the feeding roller 14. In this manner, the document feeding path directed toward the contact position T1 can be properly narrowed, and the number of the documents directed toward the contact position T1 can be properly restricted. As a result, the separation action can be properly obtained by the separation roller 15.

In addition, in the present embodiment, the separation portion that is disposed to face the feeding roller 14 is configured to include the rotatable separation roller 15, and the set guide 153 is configured to engage with the separation roller 15 by abutting on the cylindrical portion 98b formed around the rotation center of the separation roller 15. As described with reference to FIGS. 17A and 17B, when the thickness of the document is equal to or smaller than the predetermined thickness, there is the gap d between the set guide 153 and the cylindrical portion 98b, and when the thickness of the document exceeds the predetermined thickness, the set guide 153 abuts on the cylindrical portion 98b to displace the separation roller 15 in a direction separated from the feeding roller 14. In this manner, the separation roller 15 can be reliably separated from the feeding roller 14. In the present embodiment, the set guide 153 is configured to press down the cylindrical portion 98b forming the outer periphery of the torque limiter. However, the set guide 153 may be configured to press down the rotary shaft of the separation roller 15. In any case, the set guide 153 is configured to indirectly press down the separation roller 15 via another member. However, the set guide 153 may be configured to directly press down the separation roller 15.

Figure 19A:
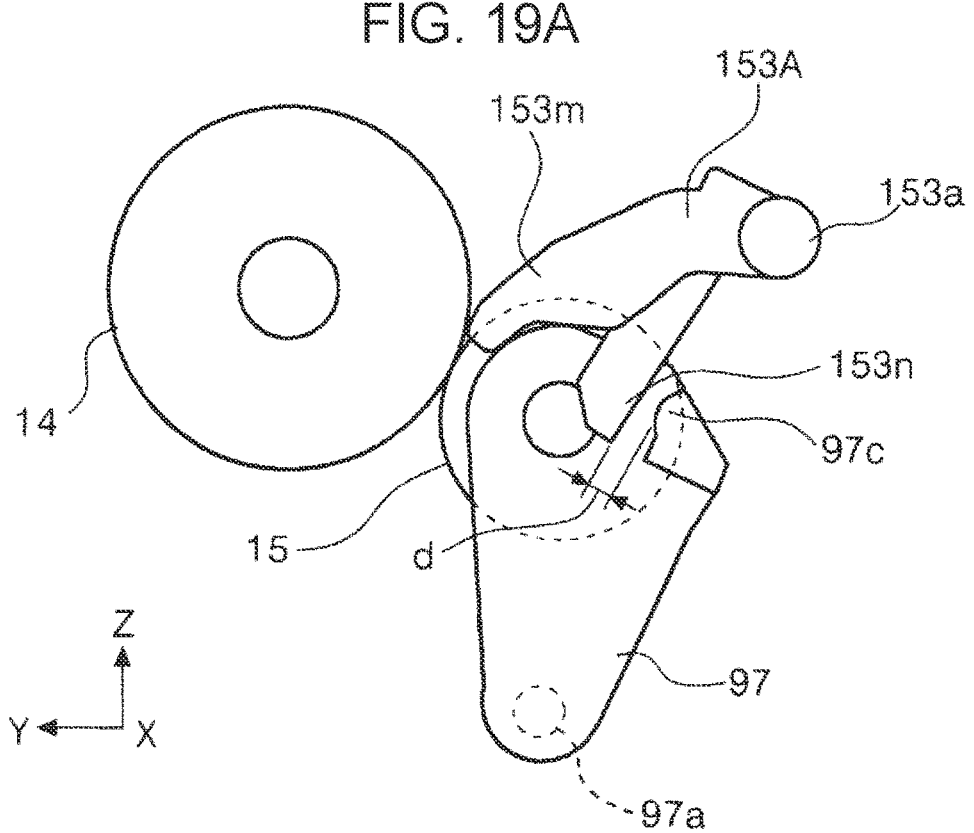
FIGS. 19A and 19B illustrate another embodiment of a configuration in which the set guide presses down the separation roller.
Figure 19B:
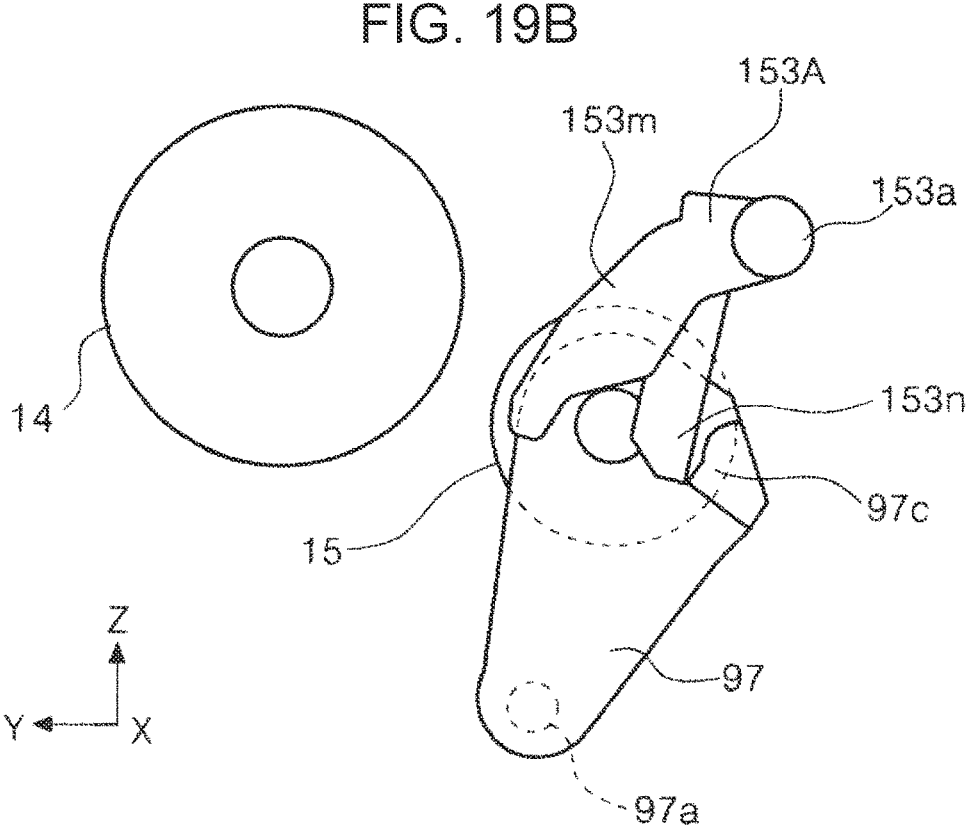

In addition, instead of the above-described embodiment, as illustrated in FIGS. 19A and 19B, the set guide may be configured to abut on an abutting portion 97c formed in a roller holder 97 holding the separation roller 15 and pivoting based on a shaft portion 97a so that the set guide engages with the separation roller 15. In FIGS. 19A and 19B, a reference numeral 153A represents a set guide according to another embodiment. The set guide 153A includes an abutting portion 153n in addition to a guide portion 153m for guiding the document. FIG. 19A illustrates a feeding start state, and in this state, the gap d is formed between the abutting portion 153n and the abutting portion 97c. The guide portion 153m narrows the document feeding path R1 directed toward the contact position T1. Since the set guide 153A is pressed down by the document to be set, the gap d disappears when the thickness of the document exceeds the predetermined thickness. The abutting portion 97c is pressed down by the abutting portion 153n as illustrated in FIG. 19B, the roller holder 97 swings, and the separation roller 15 is pressed down. In this manner, the separation roller 15 is separated from the feeding roller 14. Since the abutting portion 97c is formed in the roller holder 97 in this way, a position of the abutting portion 97c is more freely disposed, and the design can be more freely improved. In the embodiment in FIGS. 19A and 19B, a state where the document is not set in the document support section 11 or a state where the document is set in the document support section 11 but is still in a feeding standby state is a state illustrated in FIG. 23B and FIG. 24C (to be described later).

Figure 20A:
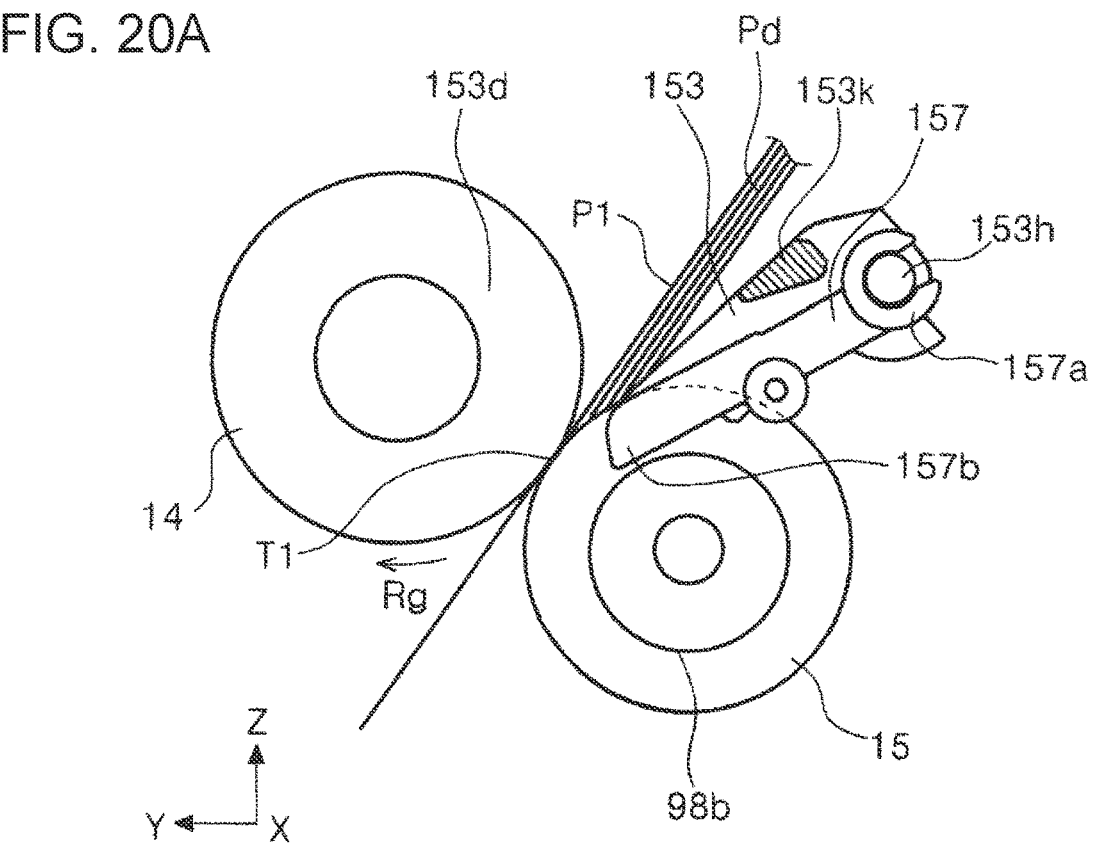
FIGS. 20A and 20B are views for describing an operation of a pressing lever.
Figure 20B:
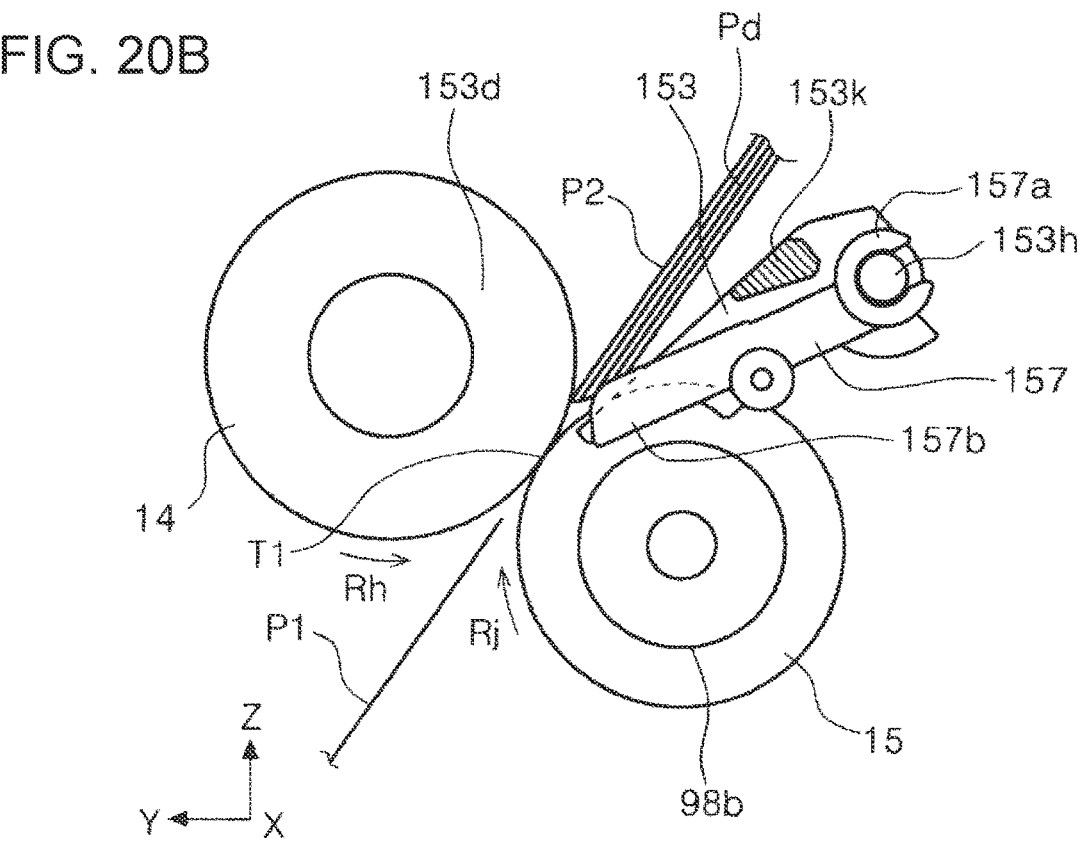

Subsequently, the movement of the pressing lever 157 will be described with reference to FIGS. 20A and 20B. In FIGS. 20A and 20B, the set flap 155 is omitted in the drawing. In FIGS. 20A and 20B, a reference numeral P1 represents a document to be fed, a reference numeral Pd represents a document bundle on a lower side of the document P1, and a reference numeral P2 represents a document which is an uppermost medium in the document bundle Pd and which is fed subsequently to the document P1. FIG. 20A illustrates a state where the document P1 is fed. In this state, the feeding roller 14 is rotated forward (in a direction of an arrow Rg) so that the feeding roller 14 applies a force for feeding the document P1 downstream in the document feeding direction. As a result, the document bundle Pd is also directed downstream in the document feeding direction. Therefore, the document bundle Pd presses down the pressing lever 157 against a spring force of the second spring 162 (refer to FIG. 12), and the pressing lever 157 is brought into a state where the pressing lever 157 does not protrude upward from the set guide 153.

In this state, the pressing lever 157 does not come into contact with the cylindrical portion 98b, and the pressing lever 157 does not press down the separation roller 15. In this manner, it is possible to prevent the separation roller 15 from being separated from the feeding roller 14 at an improper timing.

Next, when the trailing end of the document P1 passes through the contact position T1 between the feeding roller 14 and the separation roller 15 from a state in FIG. 20A, spring back is generated in the torque limiter which applies a rotational load to the separation roller 15, and the separation roller 15 rotates rearward (direction of an arrow Rj). In the present embodiment, since the feeding roller 14 is not provided with the one-way clutch, the feeding roller 14 also rotates rearward as the separation roller 15 rotates rearward (direction of an arrow Rh).

Here, when the feeding roller 14 can freely rotate rearward, the rearward rotation of the feeding roller 14 causes the document bundle Pd including the document P2 to vigorously return upstream in the document feeding direction, thereby causing a possibility that remarkable an oblique motion or non-feeding may occur. However, the pressing lever 157 is provided, and the trailing end of the document P1 to be fed passes through the contact position T1. Thereafter, the document bundle Pd is pressed toward the feeding roller 14 by the tip portion 157b of the pressing lever 157. In this manner, it is possible to prevent a phenomenon in which the document bundle Pd vigorously returns upstream in the document feeding direction, and it is possible to prevent a feeding defect such as an oblique motion and non-feeding. In particular, the present embodiment has a configuration in which the uppermost document is first fed from the document supported by the document support section 11. Therefore, the uppermost document P2 which tends to return upstream in the document feeding direction due to the rearward rotation of the feeding roller 14 is likely to obliquely move, and is likely to return upstream in the document feeding direction. However, due to the action of the pressing lever 157 described above, it is possible to prevent the phenomenon in which the document P2 vigorously returns upstream in the document feeding direction, and it is possible to prevent a feeding defect such as an oblique motion and non-feeding.

In addition, in the present embodiment, the pressing lever 157 rotates around the shaft portion 153h serving as a rotary shaft. In this manner, the tip portion 157b moves forward and rearward with respect to the feeding roller 14, and the shaft portion 153h is located upstream in the document feeding direction with respect to the tip portion 157b. Here, when the document tends to return upstream in the document feeding direction by the rearward rotation of the feeding roller 14, and when the pressing lever 157 coming into contact with the document is likely to rotate in the clockwise direction in FIGS. 20A and 20B, the document is likely to return upstream in the document feeding direction. However, the shaft portion 153h is located upstream in the document feeding direction with respect to the tip portion 157b. Therefore, a configuration is adopted in which the pressing lever 157 coming into contact with the document is less likely to rotate, and it is possible to effectively prevent the phenomenon in which the document returns upstream due to the rearward rotation of the feeding roller 14.

In addition, the set guide 153 is provided with the abutting portion 153k that restricts a rotation limit of the pressing lever 157 in a direction in which the tip portion 157b of the pressing lever 157 moves forward to the feeding roller 14. In this manner, it is possible to more reliably prevent the rotation of the pressing lever 157 in the clockwise direction in FIG. 37, and it is possible to effectively prevent the phenomenon in which the document returns upstream due to the rearward rotation of the feeding roller 14.

In addition, in the present embodiment, as described with reference to FIG. 13, the pressing lever 157 is provided in a region of the feeding roller 14 in the X-axis direction, that is, in the width direction which is a direction intersecting with the document feeding direction. In this manner, the document can be reliably pressed against the feeding roller 14 by the pressing lever 157, and it is possible to more reliably prevent the phenomenon in which the medium returns upstream due to the rearward rotation of the feeding roller 14.

Figure 21:
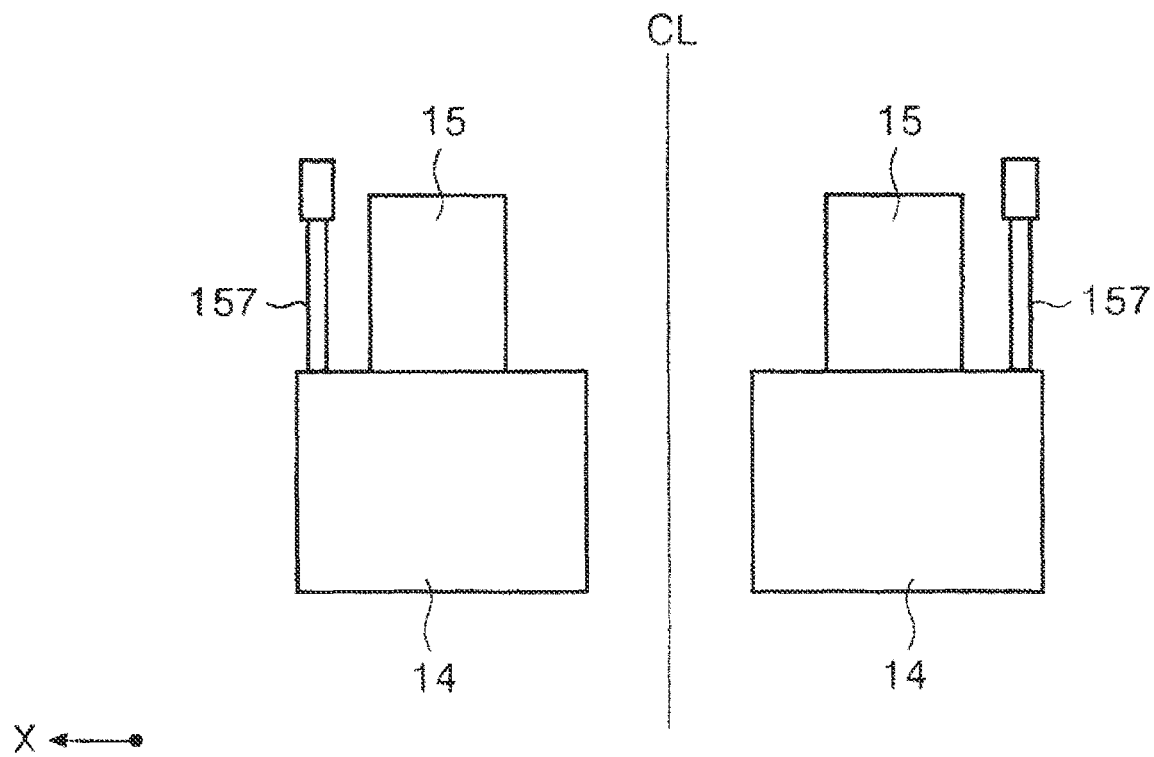
FIG. 21 is a view illustrating a disposition example of a pressing lever when a plurality of feeding rollers are provided.

In addition, in the present embodiment, the pressing levers 157 are provided in both end portions in the width direction with respect to one feeding roller 14. In this manner, it is possible to prevent an oblique motion when the document tends to return upstream due to the rearward rotation of the feeding roller 14. When a plurality of the feeding rollers 14 are provided in the X-axis direction as illustrated in FIG. 21, it is preferable that the pressing levers 157 are provided in both end portions with respect to all of the plurality of feeding rollers 14. In this manner, it is possible to prevent an oblique motion when the document tends to return upstream. In addition, instead of a configuration provided with the plurality of pressing levers 157, for example, one pressing lever 157 may be provided at a center position in the X-axis direction.

In addition, in the present embodiment, the plurality of pressing levers 157 can independently move forward and rearward with respect to the feeding roller 14. Here, when a configuration is adopted in which the plurality of pressing levers 157 integrally move forward and rearward, a difference occurs in a state where the document is pressed by each of the plurality of pressing levers 157, thereby causing a possibility that the document may obliquely move. For example, when one pressing lever 157 is in contact with the document and the other pressing lever 157 is not in contact with the document, an oblique motion of the document occurs. However, in the present embodiment, the plurality of pressing levers 157 can independently move forward and rearward with respect to the feeding roller 14. Therefore, each of the plurality of pressing levers 157 properly presses the document, and the oblique motion can be prevented.

In addition, in the present embodiment, as described with reference to FIG. 16, the contact position T3 where the pressing lever 157 abuts on the feeding roller 14 is located upstream of the contact position T2 where the set guide 153 abuts on the feeding roller 14. Therefore, when the document tends to return upstream due to the rearward rotation of the feeding roller 14, the document can be pressed for a longer period of time, and it is possible to more reliably prevent the phenomenon in which the document returns upstream due to the rearward rotation of the feeding roller 14.

In addition, the pressing force of the second spring 162 pressing the pressing lever 157 is smaller than the pressing force of the first spring 161 pressing the set guide 153. Therefore, the pressing lever 157 is likely to retract from the document feeding path when the document is fed, and it is possible to prevent the pressing lever 157 from obstructing the feeding of the document.

Figure 22:
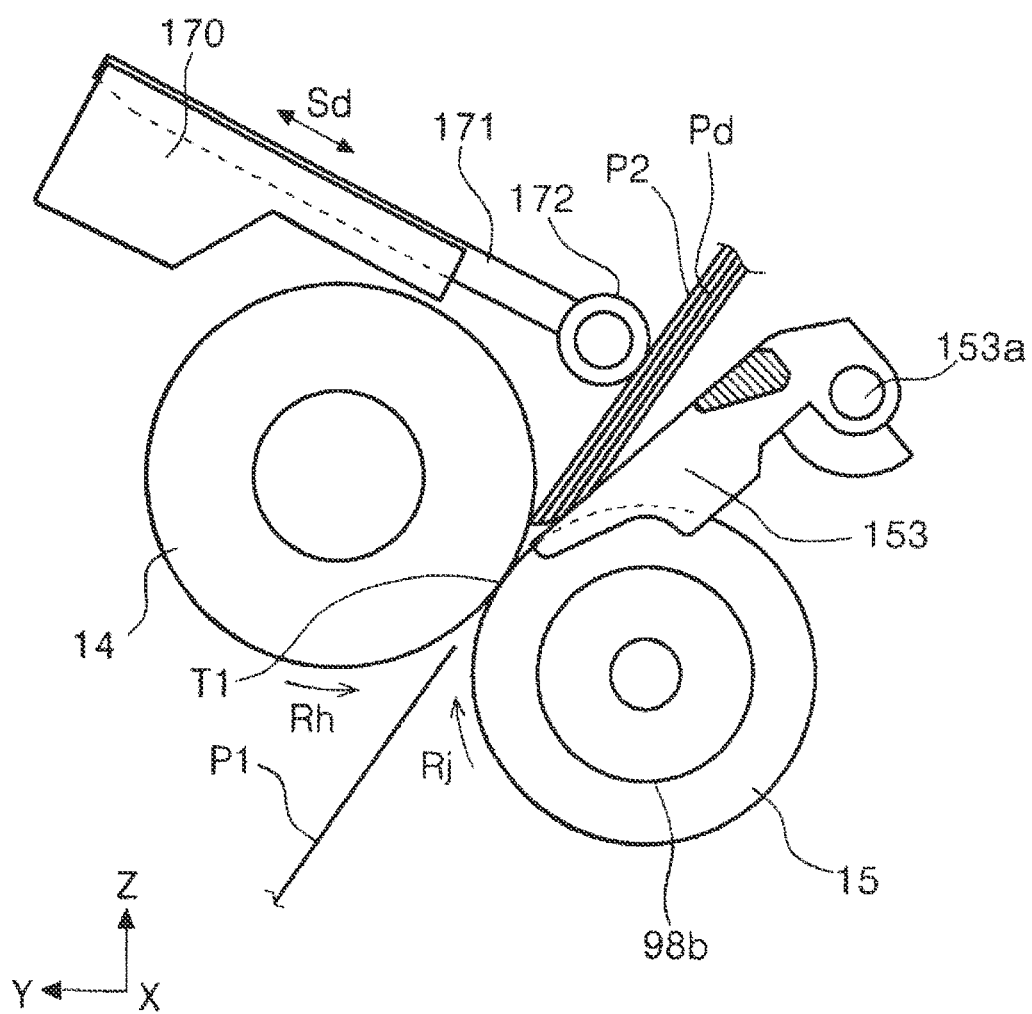
FIG. 22 is a view illustrating another embodiment of a pressing portion.

The pressing portion capable of pressing the document toward the feeding roller 14 can also be configured as illustrated in FIG. 22. In FIG. 22, an arm portion 171 is provided to be slidable with respect to a support portion 170 in a direction of an arrow Sd, and a driven roller 172 is provided in the tip portion of the arm portion 171. The arm portion 171 is pressed by a spring (not illustrated) in a direction in which the arm portion 171 moves forward to the document, and the driven roller 172 is pressed against the document by the pressing. In this manner, it is possible to prevent a phenomenon in which the document bundle Pd vigorously returns upstream in the document feeding direction when the feeding roller 14 rotates rearward (direction of an arrow Rh), and it is possible to prevent a feeding defect such as an oblique motion and non-feeding. In addition, the driven roller 172 prevents a feeding load applied to the document to be fed.

Next, disposition of the set flap 155 and the set guide 153 in the scanner 1 illustrated in FIGS. 1 to 18B, 20A, 20B, and 21, and an operation of the set guide 153 based on an operation of the set flap 155 will be described in more detail with reference to FIGS. 23A to 24C. However, the following contents are applicable to the scanner 1 having another configuration such as the scanner 1 illustrated in FIGS. 19A, 19B, and 22, as long as there is a portion applicable in terms of the configuration.

Figure 23A:
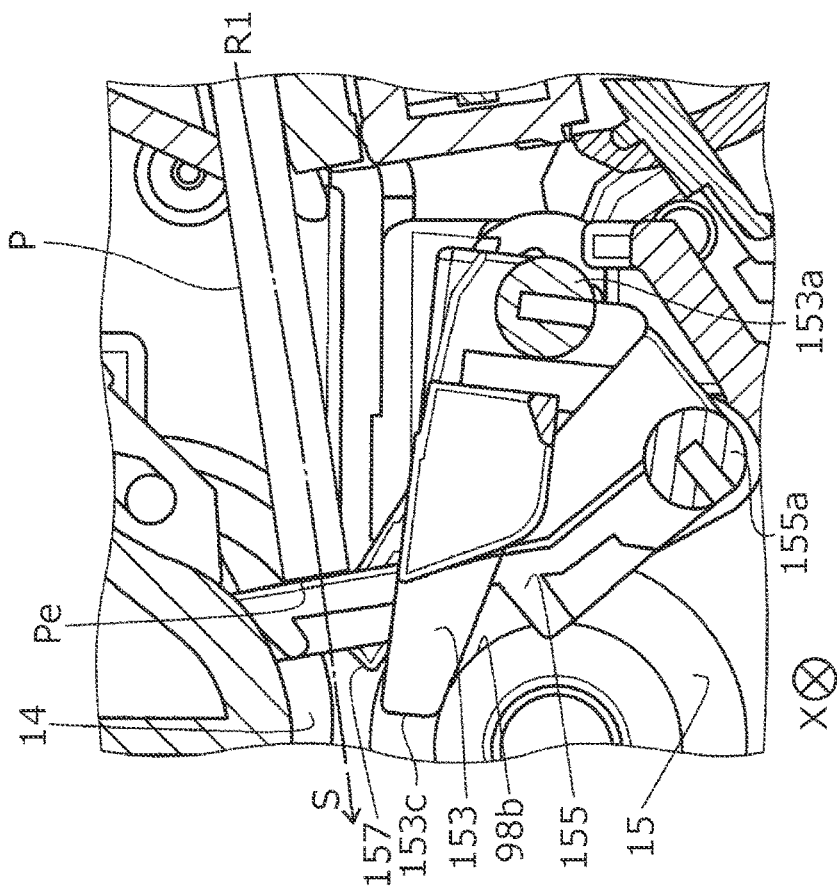
FIGS. 23A and 23B are views for describing disposition of a set flap and a set guide.

FIGS. 23A to 24C are sectional views taken along respectively different cross sections. In the scanner 1 of the present embodiment, when a document feeding instruction is input from a user and a document feeding operation is completed, the transport motor 50 is rotated in a direction opposite to that at the time of feeding. Since the transport motor 50 is rotated in the direction opposite to that at the time of feeding, a state illustrated in FIG. 23A is changed to a state illustrated in FIG. 23B. A state illustrated in FIG. 19A is a feeding start state, and a state illustrated in FIG. 13B is a feeding standby state. Specifically, in FIG. 23, the set flap 155 rotates in the clockwise direction with reference to the base portion 155a, and the set guide 153 rotates in the counterclockwise direction with reference to the rotary shaft 153a as the set flap 155 rotates in the clockwise direction. Since the set guide 153 rotates in the counterclockwise direction with reference to the rotary shaft 153a, an interval between the feeding roller 14 and the set guide 153, that is, a range of the setting position of the document P is widened. In this manner, it is easier to place the document P. In the present example, the long ribs 153b, 153c, 153d, and 153e are configured to rotate to such an extent that the cylindrical portion 98b is not pressed down. However, a configuration may be adopted as follows. The set guide 153 may rotate in the counterclockwise direction with reference to the rotary shaft 153a so that the long ribs 153b, 153c, 153d, and 153e press the cylindrical portion 98b downward. In this manner, a thick medium such as a bundle of a plurality of sheets and a booklet can be easily placed as the document P.

Figure 24A:
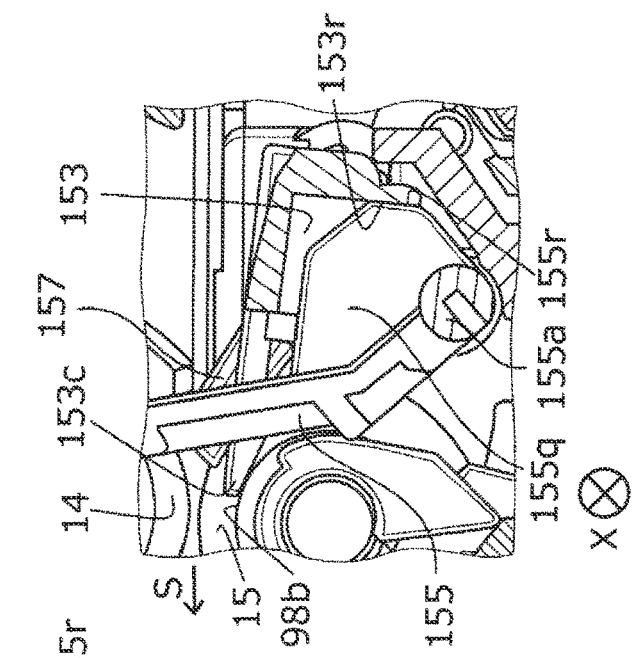
FIGS. 24A to 24C are views for describing an operation of the set guide based on an operation of the set flap.
Figure 24B:
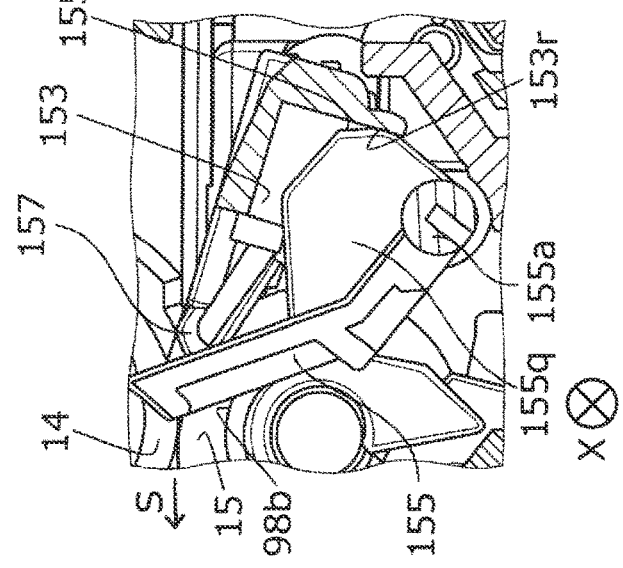
Figure 24C:
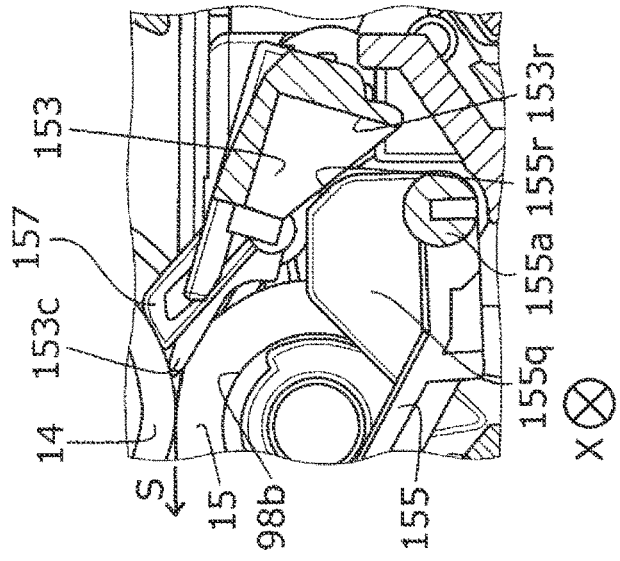

As illustrated in FIGS. 24A to 24C, the set flap 155 is provided with a cam portion 155q, and an outer peripheral surface of the cam portion 155q is provided with a contact target portion 155r coming into contact with the contact portion 153r of the set guide 153. In a state illustrated in FIG. 24A corresponding to FIG. 23A, the contact target portion 155r is disposed not to come into contact with the contact portion 153r. Since the set flap 155 rotates in the clockwise direction from the state illustrated in FIG. 24A, the state is changed to a state illustrated in FIG. 24B, and the contact target portion 155r comes into contact with the contact portion 153r. Since the set flap 155 further rotates in the clockwise direction from the state illustrated in FIG. 24B, the contact portion 153r is pressed by the contact target portion 155r as illustrated in FIG. 24C. Accordingly, the set guide 153 rotates in the counterclockwise direction with reference to the rotary shaft 153a, and the long ribs 153b, 153c, 153d, and 153e are pressed downward.

Figure 23B:
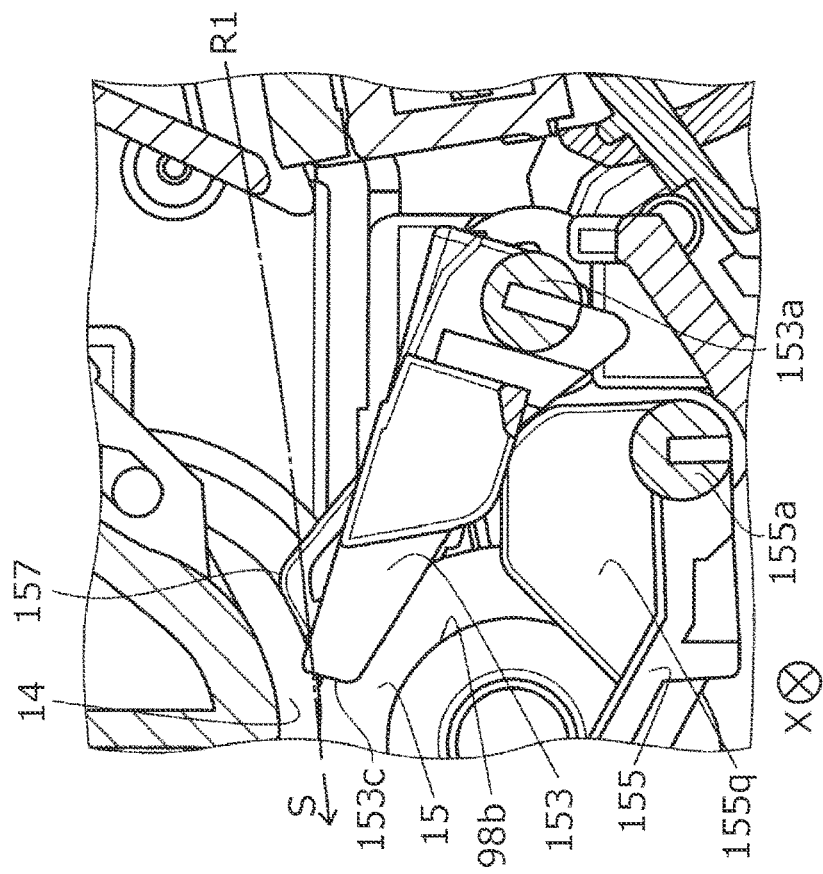

When a user newly sets the document P in the document support section 11, a new feeding instruction for the document P is input from the user, and the feeding operation of the document P starts, the set flap 155 rotates in the counterclockwise direction. In this manner, the set guide 153 rotates in the clockwise direction, and the state in FIG. 23B is displaced to the state in FIG. 23A. In this manner, the set guide 153 causes the set document P to abut on the feeding roller 14, and the document P starts to be fed. In FIGS. 23A to 24C, in a state where the document P is not set in the document support section 11 or in a state where the document P is set in the document support section 11 but is still in a feeding standby state, the state is changed to the states illustrated in FIGS. 23B and 24C.

As described above, in the scanner 1 of the present embodiment includes the document support section 11 serving as a placement section on which the document P serving as a medium is placed, the document feeding path R1 serving as a portion of the transport path through which the document P is transported, and the feeding roller 14 that feeds the document P placed on the document support section 11 in the document feeding path R1. The scanner 1 includes the set guide 153 that guides the document P to the feeding roller 14 and can switch between the contact position illustrated in FIG. 23A in which the document P and the feeding roller 14 are brought into contact, and the separation position illustrated in FIG. 23B in which the document P and the feeding roller 14 are separated. Furthermore, the scanner 1 includes the set flap 155 serving as the restricting section that can switch the restricting position illustrated in FIG. 23B in which the feeding of the document P is restricted by the feeding roller 14 coming into contact with a leading end Pe of the document P in a feeding direction S, and the allowing position illustrated in FIG. 23A in which the feeding of the document P is allowed. Here, the set guide 153 and the set flap 155 are provided in the first unit 3 as a lower unit located below the document feeding path R1 in the direction of gravity, and are provided below the document feeding path R1 in the direction of gravity.

As in the scanner 1 of the present embodiment, a configuration is adopted in which the set guide 153 and the set flap 155 are provided below the document feeding path R1 in the direction of gravity, that is, the set guide 153 and the set flap 155 are provided on the same side with respect to the transport path. In this manner, the medium transport device can be formed to be thin in the direction of gravity, and the medium transport device can be reduced in size. A fact that the set guide 153 and the set flap 155 are provided below the document feeding path R1 in the direction of gravity means that the set guide 153 and the set flap 155 can be provided at positions facing the lower surface of the document P to be transported. In addition, as in the scanner 1 of the present embodiment, the set guide 153 can switch between the contact position and the separation position. In this manner, an opening area can be widened when the medium is set, and a thick medium or a plurality of media can be easily set. The scanner 1 of the present embodiment is a sheet feed type scanner having the second unit 4 serving as an upper unit and the first unit 3 serving as a lower unit. However, the present disclosure is also applicable to a medium transport device other than the configuration having the upper unit and the lower unit. In addition, the scanner 1 of the present embodiment has a configuration including one transport motor 50 serving as the drive source for generating the power for switching the set guide 153 and the power for switching the set flap 155. The scanner 1 of the present embodiment has a configuration in which the drive source for generating the power for switching the set guide 153 also serves as the drive source for generating the power for switching the set flap 155. However, the present disclosure is not limited to this configuration. For example, a drive source for generating the power for switching the set guide 153 and a drive source for generating the power for switching the set flap 155 may be separately provided.

In other words, the scanner 1 of the present embodiment includes the first unit 3 serving as a lower unit forming a lower surface below the document feeding path R1 in the direction of gravity, and the second unit 4 that is provided to be openable and closeable with respect to the first unit 3 and serves as an upper unit forming an upper surface above the document feeding path R1 in the direction of gravity in a closed state. The set guide 153 and the set flap 155 are provided in the lower unit. According to this configuration, for example, in a sheet feed type medium transport device having the lower unit and the upper unit, the medium transport device can be effectively reduced in size. In addition, since the set guide 153 and the set flap 155 are not provided in the upper unit, a weight of the upper unit can be reduced, and the opening/closing operation of the upper unit can be facilitated.

In addition, as described above, in the scanner 1 of the present embodiment, in addition to the set guide 153 and the set flap 155, the transport motor 50 is also provided below the document feeding path R1 in the direction of gravity. Specifically, as illustrated in FIG. 7, the transport motor 50 is provided in the first unit 3 serving as the lower unit. According to this configuration, the medium transport device can be configured to be particularly thin in the direction of gravity, and the medium transport device can be particularly reduced in size. However, the present disclosure is not limited to this configuration, and a configuration in which the transport motor 50 is provided in the second unit 4 serving as the upper unit can also be adopted. In addition, a configuration may also be adopted so that at least a portion of the transport motor 50 is provided on the lower surface of the document feeding path R1. A configuration may also be adopted so that the rotary shaft of the transport motor 50 is provided below the document feeding path R1.

In addition, as described above, in the scanner 1 of the present embodiment, the set guide 153 rotates in accordance with the rotation of the set flap 155 rotated by the power from the transport motor 50. That is, the power is transmitted from the transport motor 50 via the set flap 155. The set guide 153 is located at the separation position when the set flap 155 is located at the restricting position as illustrated in FIG. 23B, and is located at the contact position when the set flap 155 is located at the allowing position as illustrated in FIG. 23B. According to this configuration, it is possible to simplify the configuration in which the power is transmitted from the transport motor 50 to the set guide 153. The set guide 153 can be located at a position where the document P is not fed to the feeding roller 14 when the set flap 155 is located at the restricting position, and can be located at a position where the document P is fed to the feeding roller 14 when the set flap 155 is located at the allowing position. The scanner 1 of the present embodiment has a configuration in which the set guide 153 comes into direct contact with the set flap 155 to transmit the power from the transport motor 50. However, the present disclosure is not limited to this configuration. For example, a configuration may be adopted so that the set guide 153 transmits the power from the transport motor 50 via a power transmission mechanism in addition to the set flap 155.

In addition, as illustrated in FIGS. 24A to 24C, in the scanner 1 of the present embodiment, the set guide 153 has the contact portion 153r that comes into contact with the contact target portion 155r of the set flap 155. As illustrated in FIG. 24C, the contact target portion 155r of the set flap 155 is switched to the separation position by coming into contact with the contact portion 153r, and as illustrated in FIG. 24A, the contact target portion 155r of the set flap 155 is switched to the contact position by being separated from the contact portion 153r. In this way, since the set guide 153 is configured to directly transmit the power from the set flap 155, it is possible to particularly simplify the configuration in which the power is transmitted from the transport motor 50 to the set guide 153.

As illustrated in FIGS. 5 and 6, the scanner 1 of the present embodiment includes a plurality of transport roller pairs such as the first transport roller pair 16 and the second transport roller pair 20 which transport the document P fed from the feeding roller 14 in the document feeding path R1, the reading transport path R2, the reversing transport path R3, and the non-reversing transport path R4 which serve as the transport paths. The transport motor 50 generates all of the power for the feeding roller 14 and each transport roller pair. In this way, it is preferable to adopt a configuration in which the transport motor 50 generates the power for at least one of the feeding roller 14 and the transport roller pair, that is, a configuration in which the drive source for generating the power for switching the set guide 153 and the power for switching the set flap 155 also serves as the drive source for generating the power for at least one of the feeding roller 14 and the transport roller pair. According to this configuration, the number of the drive sources can be reduced, a device configuration can be simplified, and the medium transport device can be particularly reduced in size.

Figure 25:
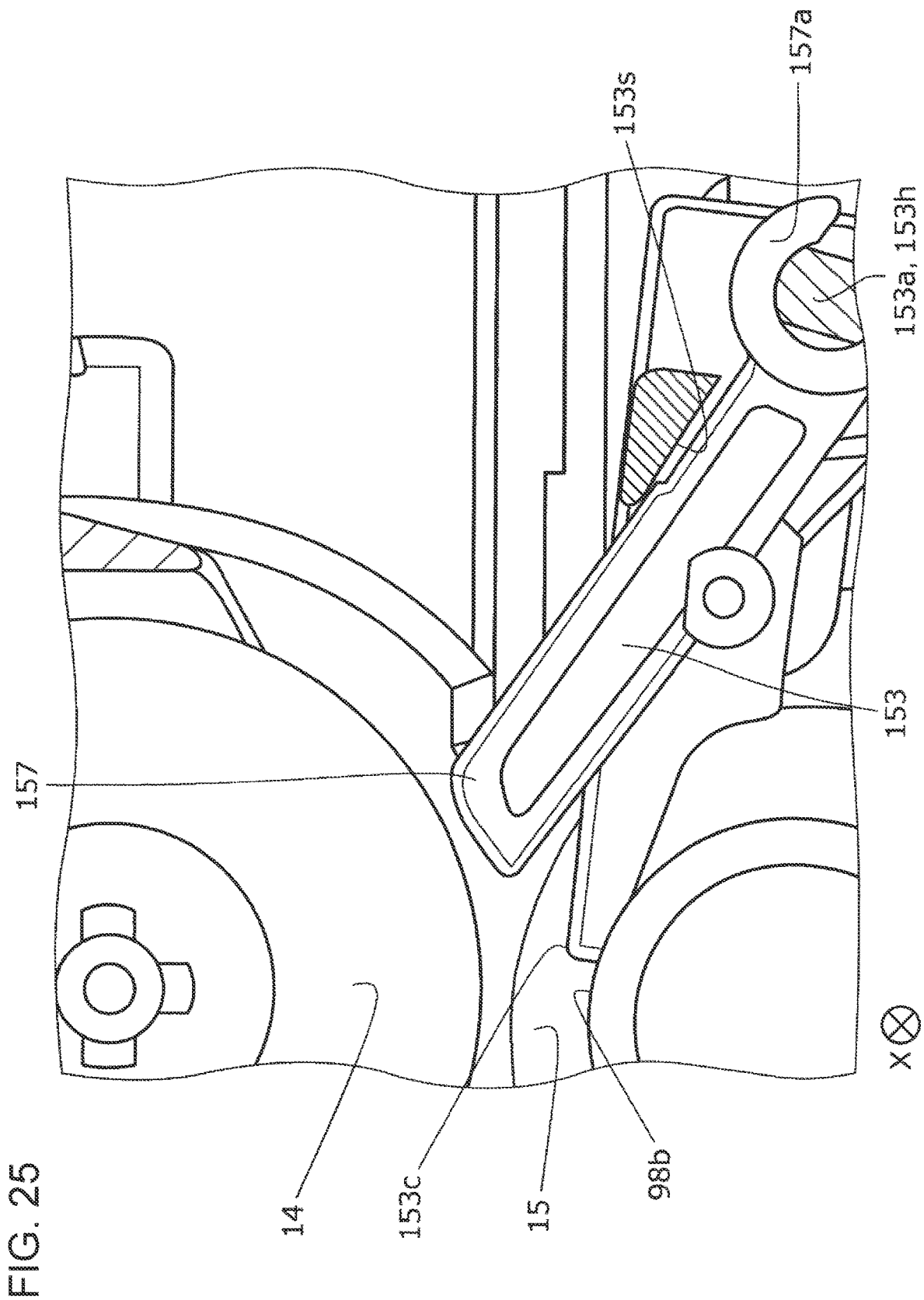
FIG. 25 is a view illustrating an engaging portion between the set guide and the pressing lever.

Here, the operation of the pressing lever 157 based on the operation of the set guide 153 in the scanner 1 illustrated in FIGS. 1 to 18B, 20A, 20B, and 21 will be described in more detail with reference to FIG. 25. However, the following contents are applicable to the scanner 1 having another configuration such as the scanner 1 illustrated in FIGS. 19A and 19B, as long as there is a portion applicable in terms of the configuration.

As described above, the set guide 153 is pressed by the first spring 161 in the rotation direction toward the feeding roller 14 around the rotary shaft 153a, and the pressing lever 157 is pressed by the second spring 162 in the rotation direction toward the feeding roller 14 around the shaft portion 153h. As illustrated in FIG. 25, the set guide 153 is provided with a protrusion portion 153s protruding in the X-direction. When the pressing lever 157 rotates in the clockwise direction with respect to the set guide 153, the set guide 153 is configured to abut on the protrusion portion 153s. In this way, the pressing lever 157 is configured to be rotatable coaxially with respect to the set guide 153 and to be capable of abutting on the set guide 153. In this manner, a configuration is adopted in which the pressing lever 157 can be displaced in synchronization with the set guide 153.

In addition, as described above, the scanner 1 of the present embodiment includes the separation roller 15 that is disposed to face the feeding roller 14. When the plurality of documents P are stacked and placed on the document support section 11, the separation roller 15 can separate the document P by nipping the document P together with the feeding roller 14. In addition, as illustrated in FIG. 23, the scanner 1 of the present embodiment includes the pressing lever 157 serving as the pressing portion that is disposed upstream of the nipping position between the feeding roller 14 and the separation roller 15 in the feeding direction S, and capable of switching between the first position illustrated in FIG. 23A where the pressing lever 157 is pressed against the feeding roller 14 by moving forward and rearward to the feeding roller 14 and the second position illustrated in FIG. 23B where the pressing lever 157 is separated from the feeding roller 14. Here, after the trailing end of the preceding medium in the feeding direction S, the preceding medium (corresponding to the document P1 in FIGS. 20A and 20B) separated and fed precedently by the separation roller in the plurality of documents P stacked and placed at the second position, passes through the nipping position (corresponding to the contact position T1 in FIGS. 20A and 20B), the succeeding medium other than the preceding medium (corresponding to the document bundle Pd other than the document P1 in FIGS. 20A and 20B) in the plurality of documents P stacked and placed at the first position is pressed against the feeding roller 14, and the power is transmitted from the transport motor 50 via the set guide 153. In this manner, the pressing lever 157 is switched between the first position and the second position.

As described above, the scanner 1 is configured to include the pressing lever 157 switched between the first position and the second position by the power transmitted from the transport motor 50 via the set guide 153 or the set flap 155. In this manner, for example, even when a force is applied from the feeding roller 14 to the document P to rotate the feeding roller 14 rearward and move in the direction opposite to the feeding direction S, the pressing lever 157 presses the document P so that the document P can be prevented from moving in the direction opposite to the feeding direction S. In addition, since it is not necessary to separately prepare a mechanism for transmitting the power to the pressing lever 157, it is possible to simplify the configuration for transmitting the power from the transport motor 50 to the pressing lever 157. The scanner 1 of the present embodiment has a configuration in which the pressing lever 157 transmits the power from the transport motor 50 via the set guide 153. However, a configuration may be adopted in which the pressing lever 157 transmits the power from the transport motor 50 via the set flap 155. In addition, the scanner 1 of the present embodiment has a configuration in which the pressing lever 157 comes into direct contact with the set guide 153 to transmit the power from the transport motor 50. However, the present disclosure is not limited to this configuration. For example, a configuration may be adopted in which the pressing lever 157 transmits the power from the transport motor 50 via the power transmission mechanism in addition to the set guide 153 or the set flap 155.

Figure 26:
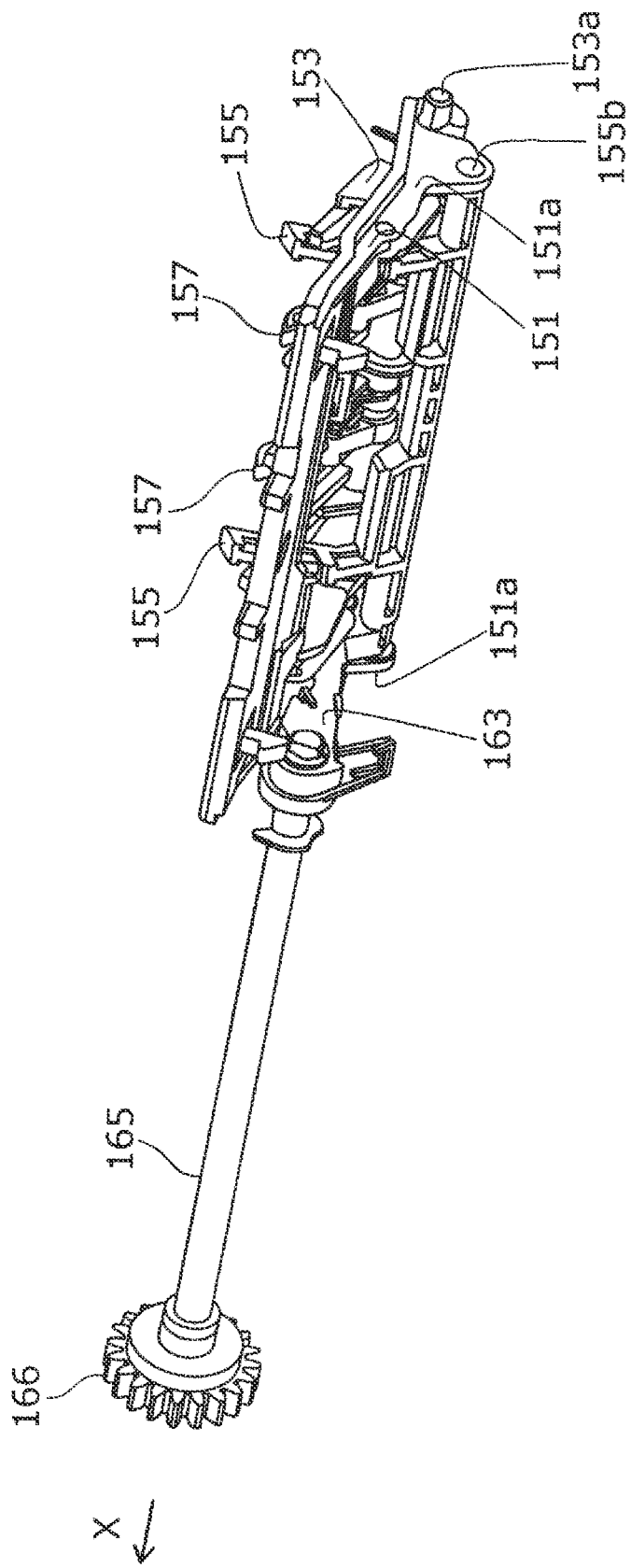
FIG. 26 is a perspective view illustrating a portion of a mechanism for driving the set flap in a state where the set flap and the set guide are attached to the guide member.

Here, a configuration of the guide member 151 to which the set guide 153 and the set flap 155 are attached in the scanner 1 illustrated in FIGS. 1 to 18B, 20A, 20B, and 21 will be described in more detail with reference to FIGS. 26 to 28. However, the present disclosure is applicable to the scanner 1 illustrated in FIGS. 19A, 19B, and 22, as long as there is a portion applicable in terms of the configuration.

As illustrated in FIG. 10, the guide member 151 serves as a path member forming the transport path of the document P. As illustrated in FIGS. 26 to 28, both the set guide 153 and the set flap 155 are attached to the path member. Specifically, the rotary shaft 153a of the set guide 153 and the shaft portion 155b of the set flap 155 are attached to the bearing portion 151a forming a side frame of the guide member 151. As illustrated in FIG. 10, the guide member 151 is disposed around the separation roller 15. The guide member 151 may overlap with at least a portion of the separation roller 15 and an attachment portion of the separation roller 15 when viewed in a direction facing a transport surface of the document P in the transport path. In a case of this configuration, the guide member 151 can be expressed as a cover member of the separation roller 15.

When a positional relationship between the set guide 153 and the set flap 155 deviates from a preferable positional relationship, there is a possibility that functions of the set guide 153 and the set flap 155 may be insufficient. However, a configuration is adopted in which both the set guide 153 and the set flap 155 are attached to the guide member 151. In this manner, the set guide 153 and the set flap 155 can be attached to the same member. Therefore, it is possible to prevent the positional relationship between the set guide 153 and the set flap 155 from deviating from the preferable positional relationship.

Figure 27:
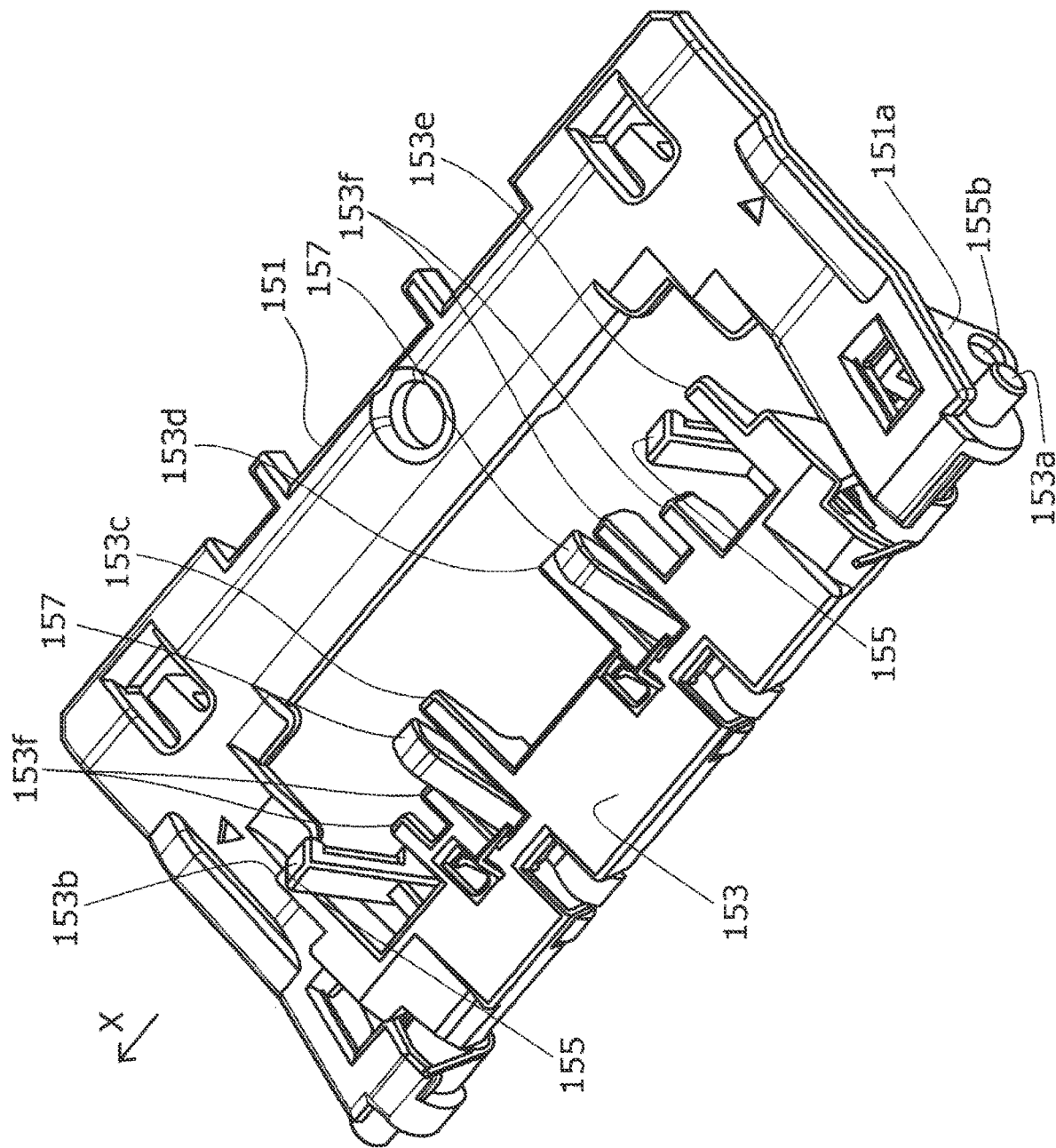
FIG. 27 is a perspective view illustrating a state where the set flap and the set guide are attached to the guide member.
Figure 28:
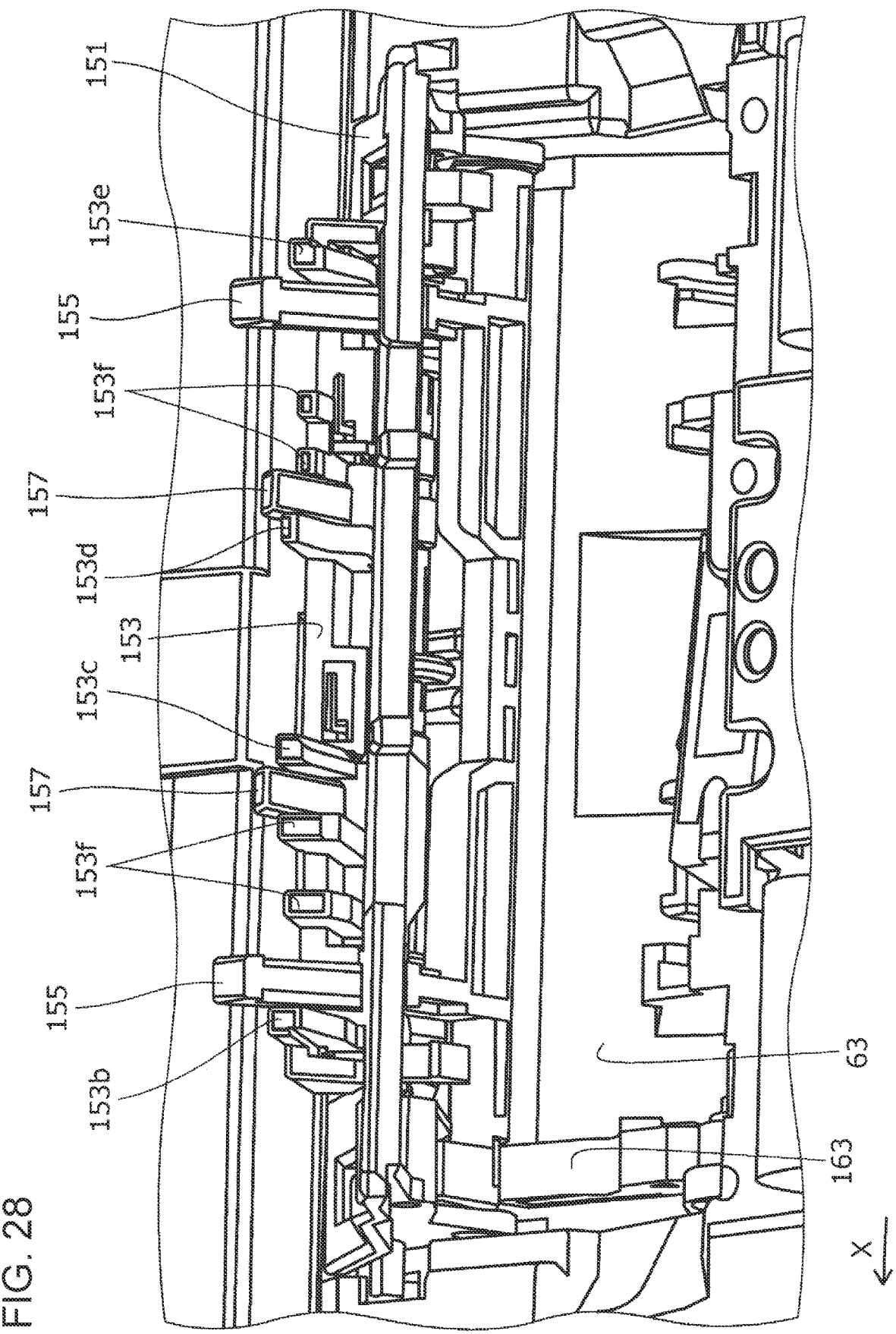
FIG. 28 is a perspective view illustrating disposition of the guide member with respect to the separation roller.

In addition, as illustrated in FIG. 27, the guide member 151 is attachable and detachable together with the set guide 153 and the set flap 155. Therefore, for example, when the separation roller 15 is replaced, the guide member 151 is detached so that the set guide 153 and the restricting section are also detachable, and the separation roller can be easily replaced. In particular, when a configuration is adopted so that the guide member 151 also serves as a cover member for the separation roller 15, the separation roller can be particularly easily replaced. In the present example, the path member is configured to be attachable and detachable together with the set guide and the restricting section. However, the present disclosure is not limited to this configuration. For example, the path member may be configured to be rotated and displaced with reference to the rotation axis together with the set guide and the restricting section.

Here, a mechanism in which the set flap 155 rotates in accordance with the rotation of the set flap cam 163 in the scanner 1 illustrated in FIGS. 1 to 18B, 20A, 20B, and 21 will be described in more detail with reference to FIGS. 29A and 29B. However, the following contents are applicable to the scanner 1 having another configuration such as the scanner 1 illustrated in FIGS. 19A, 19B, and 22, as long as there is a portion applicable in terms of the configuration.

Figure 29B:
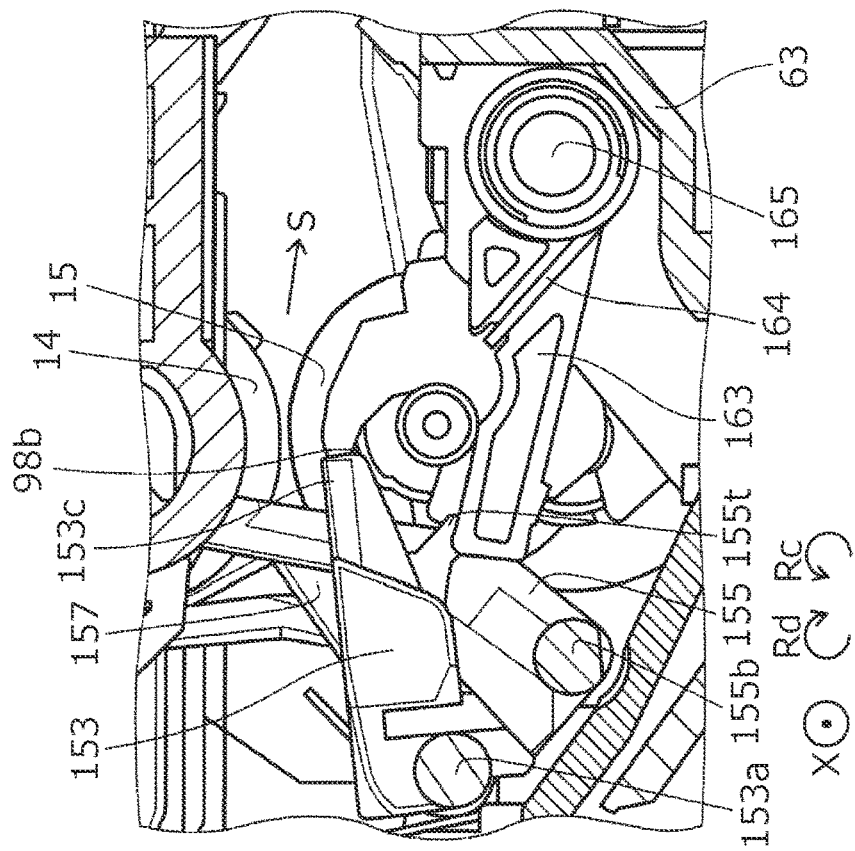
FIGS. 29A and 29B are views for describing an operation of the set flap based on an operation of a set flap cam.
Figure 29A:
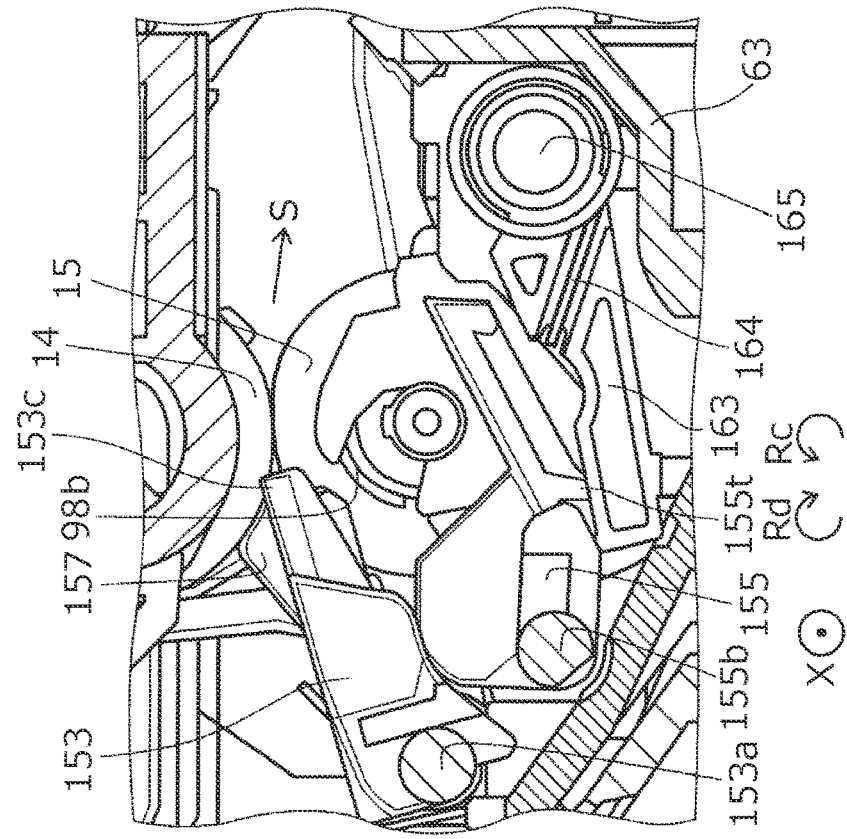

As illustrated in FIGS. 29A and 29B, the set flap cam 163 is provided with the spring 164. The spring 164 is hooked on a first spring hooking portion (not illustrated) provided in the first frame 63 and a second spring hooking portion 163a provided in the set flap cam 163, and a pressing force is applied in the direction of the arrow Rc with respect to the first frame 63. FIG. 29A illustrates the document P in a feeding start state, and FIG. 29B illustrates a feeding standby state.

When the transport motor 50 rotates rearward as the operation for feeding the document P is completed, the set flap cam 163 rotates in the direction of the arrow Rd when the shaft 165 is used as the rotation axis, and a state illustrated in FIG. 29A is changed to a state illustrated in FIG. 29B. The set flap cam 163 is in contact with the protrusion portion 155t of the set flap 155, and the set flap cam 163 is changed from the state illustrated in FIG. 29A to the state illustrated in FIG. 29B. In this manner, the set flap 155 rotates in the direction of the arrow Rc when the base portion 155a is used as the rotation axis. The set flap 155 rotates in the direction of the arrow Rc when the base portion 155a is used as the rotation axis. In this manner, the set guide 153 rotates in the direction of the arrow Rd with reference to the rotary shaft 153a to widen a range of the setting position of the document P.

On the other hand, when the transport motor 50 rotates forward as the operation for feeding the document P starts, the set flap cam 163 is rotated and lowered in the direction of the arrow Rc by a force of the spring 164. In accordance with this movement, the set flap 155 in contact with the set flap cam 163 is rotated and lowered in the direction of the arrow Rd. When the set flap 155 is rotated and lowered in the direction of the arrow Rd, the set guide 153 rotates in the direction of the arrow Rc with reference to the rotary shaft 153a, and abuts on the feeding roller 14 so that the document P can be transported.

Figure 30:
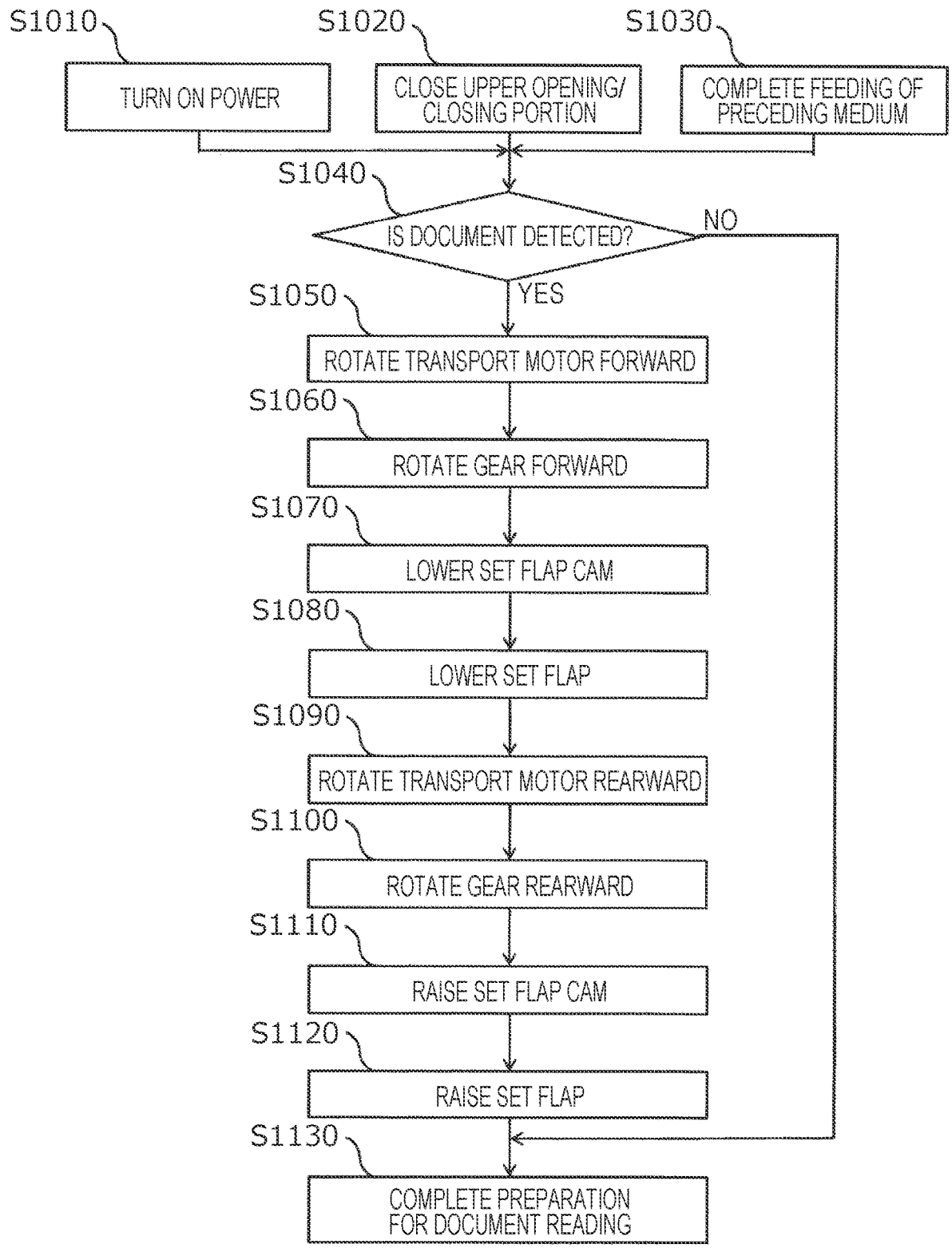
FIG. 30 is a flowchart illustrating operations of the set flap, the set guide, and the pressing lever.

Hereinafter, operations of the set flap 155, the set guide 153, and the pressing lever 157 will be described in more detail with reference to a flowchart in FIG. 30. The flowchart in FIG. 30 corresponds to a flow until a preparation is completed for reading an image of the document P by using at least one of the first reading section 32 and the second reading section 33. The flow described below is a flow in the scanner 1 illustrated in FIGS. 1 to 18B, 20A, 20B, and 21. However, the following contents are applicable to the scanner 1 having another configuration such as the scanner 1 illustrated in FIGS. 19A, 19B, and 22, as long as there is a portion applicable in terms of the configuration.

The control section 80 determines whether to turn on the power of the scanner 1 is turned on as illustrated in Step S1010, whether to close the upper opening/closing portion 10 as illustrated in Step S1020, or whether or not the document P is detected by the first document detection section 93 and the second document detection section 94 in Step S1040 when the feeding of the preceding medium is completed as illustrated in Step S1030. When the control section 80 determines that the document P is detected, the process proceeds to Step S1050. When the control section 80 determines that the document P is not detected, the process proceeds to Step S1130 to complete the preparation for reading the document P.

In Step S1050, the transport motor 50 rotates forward. In Step S1060, the gear 166 illustrated in FIG. 15 rotates forward, and rotates in the direction of the arrow Ra. In Step S1070, in accordance with the forward rotation of the gear 166, the set flap cam 163 is rotated and lowered in the direction of the arrow Rc. In accordance with lowering of the set flap cam 163, in Step S1080, the set flap 155 is rotated and lowered in the direction of the arrow Rf. As described above, the set guide 153 and the pressing lever 157 are raised in accordance with lowering of the set flap 155. Steps S1050 to S1080 are a series of operations performed in accordance with the forward rotation of the transport motor 50. After Step S1080 is completed, the process proceeds to Step S1090.

In Step S1090, the transport motor 50 rotates rearward. In Step S1100, the gear 166 illustrated in FIG. 15 rotates rearward, and rotates in the direction of the arrow Rb. In accordance with the rearward rotation of the gear 166, in Step S1110, the set flap cam 163 is rotated and raised in the direction of the arrow Rd. In accordance with raising of the set flap cam 163, in Step S1120, the set flap 155 is rotated and raised in the direction of the arrow Re. As described above, the set guide 153 and the pressing lever 157 are lowered in accordance with raising of the set flap 155. Steps S1090 to S1120 are a series of operations performed in accordance with the rearward rotation of the transport motor 50. After Step S1120 is completed, the process proceeds to Step S1130. In a state where the document is not set in the document support section 11 or in a state where the document is set in the document support section 11 but is still in a feeding standby state in accordance with completion of Step S1120, the state is changed to a state illustrated in FIG. 23B or 24C.

The present disclosure is not limited to the embodiments described above, and various modifications can be made within the scope of the appended claims, and as a matter of course, the modifications are also included in the scope of the present disclosure.

In addition, although the above-described embodiments have been described as an example of being applied to the image reading apparatus represented by a scanner, the above-described embodiments can also be applied to a recording apparatus represented by a printer. That is, the document in the above-described embodiments may be adopted as a recording target medium, and the reading section may be adopted as a recording section for recording on the recording target medium. In this manner, the same operational effects as those in the above-described embodiments can be achieved in the recording apparatus. An example of the recording apparatus includes an ink jet printer, and an example of the recording section includes an ink jet recording head.

What is claimed is:

1. A medium transport device comprising:
   a placement section on which a medium is placed;
   a transport path through which the medium is transported;
   a feeding roller that feeds the medium placed on the placement section in the transport path;
   a set guide that guides the medium to the feeding roller, the set guide configured to switch between a contact position where the medium and the feeding roller are brought into contact and a separation position where the medium and the feeding roller are separated;
   a restricting section configured to switch between a restricting position for restricting feeding of the medium by bringing the feeding roller into contact with a leading end of the medium in a feeding direction and an allowing position for allowing the feeding of the medium; and
   a drive source that generates power for switching of the set guide and switching of the restricting section,
   wherein the set guide and the restricting section are provided below the transport path in a direction of gravity.

2. The medium transport device according to claim 1, wherein the drive source is provided below the transport path in the direction of gravity.

3. The medium transport device according to claim 1, wherein when power is transmitted from the drive source via the restricting section, and the restricting section is located at the restricting position, the set guide is located at the separation position, and when the restricting section is located at the allowing position, the set guide is located at the contact position.

4. The medium transport device according to claim 3, wherein the set guide has a contact portion that comes into contact with the restricting section, is switched to the separation position when the restricting section comes into contact with the contact portion, and is switched to the contact position when the restricting section is separated from the contact portion.

5. The medium transport device according to claim 1, further comprising:
a transport roller pair that transports the medium fed by the feeding roller in the transport path,
wherein the drive source generates power for at least one of the feeding roller and the transport roller pair.

6. The medium transport device according to claim 1, further comprising:
a separation roller that is disposed to face the feeding roller and separating the medium by nipping the medium together with the feeding roller when a plurality of the media are stacked and placed on the placement section; and
a path member that is disposed on at least a portion around the separation roller and forms at least a portion of the transport path,
wherein the set guide and the restricting section are attached to the path member.

7. The medium transport device according to claim 6, wherein the path member is attachable and detachable together with the set guide and the restricting section.

8. The medium transport device according to claim 1, further comprising:
a separation roller that is disposed to face the feeding roller and separating the medium by nipping the medium together with the feeding roller when a plurality of the media are stacked and placed on the placement section; and
a pressing portion that is disposed upstream of a nipping position between the feeding roller and the separation roller in the feeding direction, and configured to switch between a first position for pressing the feeding roller by moving forward to and rearward from the feeding roller and a second position for being separated from the feeding roller,
wherein after a trailing end of a preceding medium in the feeding direction, the preceding medium separated and fed precedently by the separation roller in the plurality of media stacked and placed at the second position, passes through the nipping position, a succeeding medium other than the preceding medium in the plurality of media stacked and placed at the first position is pressed against the feeding roller, and power is transmitted from the drive source via the set guide or the restricting section so that the pressing portion is switched between the first position and the second position.

9. The medium transport device according to claim 1, further comprising:
a lower unit forming a lower surface below the transport path in the direction of gravity; and
an upper unit that is provided to be openable and closeable with respect to the lower unit, and forms an upper surface above the transport path in the direction of gravity in a closed state,
wherein the set guide and the restricting section are provided in the lower unit.

10. An image reading apparatus comprising:
the medium transport device according to claim 1; and
a reading section that reads an image of the medium transported through the transport path.

* * * * *